US011199162B2

(12) United States Patent
McCarthy, Jr. et al.

(10) Patent No.: US 11,199,162 B2
(45) Date of Patent: *Dec. 14, 2021

(54) IN-CYLINDER EGR AND VVA FOR AFTERTREATMENT TEMPERATURE CONTROL

(71) Applicant: Eaton Intelligent Power Limited, Dublin (IE)

(72) Inventors: James E. McCarthy, Jr., Kalamazoo, MI (US); Douglas J. Nielsen, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 12 days.

This patent is subject to a terminal disclaimer.

(21) Appl. No.: 16/155,884

(22) Filed: Oct. 9, 2018

(65) Prior Publication Data

US 2019/0040826 A1 Feb. 7, 2019

Related U.S. Application Data

(63) Continuation-in-part of application No. 15/541,365, filed as application No. PCT/US2017/014199 on Jan. 19, 2017, now Pat. No. 10,801,430.
(Continued)

(51) Int. Cl.
*F02M 26/47* (2016.01)
*F02D 41/14* (2006.01)
(Continued)

(52) U.S. Cl.
CPC ......... *F02M 26/47* (2016.02); *F02D 41/0002* (2013.01); *F02D 41/006* (2013.01);
(Continued)

(58) Field of Classification Search
CPC ...... F02D 17/02; F02D 41/00; F02D 41/0002; F02D 41/0007; F02D 41/0052;
(Continued)

(56) References Cited

U.S. PATENT DOCUMENTS 2,570,101 A 10/1951 Couling
4,452,208 A 6/1984 Merlin et al.
(Continued)

FOREIGN PATENT DOCUMENTS

CN 100385101 C 4/2008
CN 101787933 A 7/2010
(Continued)

OTHER PUBLICATIONS

International Search Report and Written Opinion for PCT/US2017/014202, dated Apr. 24, 2017; pp. 1-13.
(Continued)

*Primary Examiner* — John Kwon
*Assistant Examiner* — Johnny H Hoang
(74) *Attorney, Agent, or Firm* — Mei & Mark, LLP

(57) ABSTRACT

A computer control network is connected to a multiple-cylinder engine and implements aftertreatment temperature management. Processors are configured to determine an aftertreatment temperature-efficient air to fuel ratio that satisfies the sensed power output request, determine an air to fuel ratio adjustment, select an in-cylinder exhaust gas recirculation technique, select at least one EGR cylinder of the multiple-cylinder engine to implement the in-cylinder exhaust gas recirculation technique, and control the intake valves to open and the exhaust valves to close for the selected at least one EGR cylinder to adjust the oxygen and particulate content of the exhaust gas by applying at least a second compression stroke of the respective reciprocating
(Continued)

piston of the at least one EGR cylinder to the exhaust gas to push the exhaust gas through to the intake manifold.

17 Claims, 16 Drawing Sheets

Related U.S. Application Data

(60) Provisional application No. 62/570,052, filed on Oct. 9, 2017, provisional application No. 62/280,552, filed on Jan. 19, 2016.

(51) Int. Cl.
*F02D 41/00* (2006.01)
*F02M 26/68* (2016.01)
*F02M 26/01* (2016.01)
*F02M 26/16* (2016.01)
*F02M 26/21* (2016.01)
*F02D 41/02* (2006.01)
*F02D 41/26* (2006.01)

(52) U.S. Cl.
CPC ..... *F02D 41/0007* (2013.01); *F02D 41/0052* (2013.01); *F02D 41/0077* (2013.01); *F02D 41/0087* (2013.01); *F02D 41/0245* (2013.01); *F02D 41/1454* (2013.01); *F02D 41/1475* (2013.01); *F02M 26/01* (2016.02); *F02M 26/16* (2016.02); *F02M 26/21* (2016.02); *F02M 26/68* (2016.02); *F02D 41/0055* (2013.01); *F02D 41/266* (2013.01); *F02D 2041/001* (2013.01); *F02D 2041/0012* (2013.01); *F02D 2200/0802* (2013.01)

(58) Field of Classification Search
CPC .............. F02D 41/006; F02D 41/0077; F02D 41/0087; F02D 41/0245; F02D 41/1454; F02D 41/1475; F02D 2200/0802; F02D 2041/0012; F02D 2041/0265; F02M 26/01; F02M 26/16; F02M 26/21; F02M 26/47; F02M 26/68; F01N 11/002; F01N 3/2006; F01N 2570/12
USPC .................................. 701/101–105, 114, 115
See application file for complete search history.

(56) References Cited

U.S. PATENT DOCUMENTS

| | | | |
|---|---|---|---|
| 5,720,266 | A | 2/1998 | Nogi et al. |
| 5,758,493 | A | 6/1998 | Asik et al. |
| 5,845,677 | A | 12/1998 | Kim |
| 5,987,884 | A | 11/1999 | Kibe et al. |
| 6,062,026 | A | 5/2000 | Woollenweber et al. |
| 6,321,715 | B1 | 11/2001 | Dong |
| 6,786,191 | B2 | 9/2004 | Foster |
| 6,904,752 | B2 | 6/2005 | Foster et al. |
| 6,931,839 | B2 | 8/2005 | Foster |
| 6,962,143 | B2 | 11/2005 | Ryan et al. |
| 6,978,771 | B2 | 12/2005 | Kuzuyama et al. |
| 7,028,678 | B2 | 4/2006 | Betz et al. |
| 7,240,480 | B1 | 7/2007 | Brevick et al. |
| 7,308,872 | B2 | 12/2007 | Sellnau et al. |
| 7,451,597 | B2 | 11/2008 | Kojima et al. |
| 7,784,450 | B2 | 8/2010 | Koster et al. |
| 8,020,525 | B2 | 9/2011 | Winstead |
| 8,327,619 | B2 | 12/2012 | Persson |
| 8,511,154 | B2 | 8/2013 | Wang et al. |
| 8,849,550 | B2 | 9/2014 | Larsson et al. |
| 9,002,624 | B2 | 4/2015 | Kerns et al. |
| 9,080,546 | B2 | 7/2015 | Gottschalk et al. |
| 9,145,822 | B2 | 9/2015 | Yacoub |
| 9,217,339 | B2 | 12/2015 | McConville et al. |
| 9,416,743 | B2 | 8/2016 | Beikmann |
| 9,765,658 | B2 | 9/2017 | Knauf et al. |
| 9,850,811 | B2 | 12/2017 | Doering et al. |
| 9,850,831 | B2 | 12/2017 | Ossareh et al. |
| 9,874,191 | B2 | 1/2018 | Xiao et al. |
| 2003/0101961 | A1 | 6/2003 | Foster |
| 2003/0121249 | A1 | 7/2003 | Foster et al. |
| 2003/0140877 | A1 | 7/2003 | Kramer |
| 2003/0236599 | A1 | 12/2003 | Saito et al. |
| 2004/0098970 | A1 | 5/2004 | Foster |
| 2004/0214687 | A1 | 10/2004 | Morisawa et al. |
| 2004/0216449 | A1* | 11/2004 | Szymkowicz .......... F02D 41/12 60/284 |
| 2004/0255576 | A1 | 12/2004 | Brown et al. |
| 2005/0011485 | A1 | 1/2005 | Ryan et al. |
| 2005/0028517 | A1 | 2/2005 | Nakagawa et al. |
| 2005/0049108 | A1 | 3/2005 | Nishizawa et al. |
| 2005/0139193 | A1 | 6/2005 | Kobayashi et al. |
| 2005/0147286 | A1 | 7/2005 | Lee |
| 2005/0235952 | A1 | 10/2005 | Kuzuyama et al. |
| 2005/0263139 | A1 | 12/2005 | Ryan, III et al. |
| 2005/0284444 | A1 | 12/2005 | Sherman |
| 2006/0144378 | A1 | 7/2006 | Zillmer et al. |
| 2006/0180130 | A1 | 8/2006 | St. James |
| 2006/0218899 | A1 | 10/2006 | Narita et al. |
| 2007/0074513 | A1 | 4/2007 | Lamb et al. |
| 2007/0215119 | A1 | 9/2007 | Pagot |
| 2008/0071462 | A1 | 3/2008 | Christ et al. |
| 2008/0147302 | A1* | 6/2008 | Kolmanovsky ..... F02D 13/0211 701/105 |
| 2009/0020105 | A1 | 1/2009 | Koster et al. |
| 2009/0271094 | A1* | 10/2009 | Stablein ............... F02D 41/0052 701/108 |
| 2009/0312936 | A1 | 12/2009 | Kakuya et al. |
| 2010/0086414 | A1 | 4/2010 | Tai |
| 2010/0180859 | A1 | 7/2010 | Hatamura et al. |
| 2010/0204907 | A1 | 8/2010 | Nakatani et al. |
| 2011/0083639 | A1 | 4/2011 | Gallon et al. |
| 2011/0087423 | A1 | 4/2011 | Mc Donald |
| 2011/0088661 | A1 | 4/2011 | Sczomak et al. |
| 2011/0144888 | A1 | 6/2011 | Rollinger et al. |
| 2012/0079813 | A1 | 4/2012 | Sloane et al. |
| 2012/0103312 | A1 | 5/2012 | Sasai et al. |
| 2012/0166066 | A1 | 6/2012 | Fiveland et al. |
| 2012/0221217 | A1 | 8/2012 | Sujan et al. |
| 2012/0222639 | A1 | 9/2012 | Knauf et al. |
| 2012/0291534 | A1 | 11/2012 | Wang et al. |
| 2013/0019828 | A1* | 1/2013 | Nagatsu ................. F02B 11/00 123/90.15 |
| 2013/0054115 | A1 | 2/2013 | Chen et al. |
| 2013/0276752 | A1 | 10/2013 | Breuer et al. |
| 2013/0276754 | A1 | 10/2013 | Breuer et al. |
| 2014/0014062 | A1 | 1/2014 | Yacoub et al. |
| 2014/0032083 | A1 | 1/2014 | Kerns et al. |
| 2014/0053802 | A1 | 2/2014 | Rayl |
| 2014/0053803 | A1 | 2/2014 | Rayl |
| 2014/0090623 | A1 | 4/2014 | Beikmann |
| 2014/0130494 | A1 | 5/2014 | Hasegawa et al. |
| 2014/0158069 | A1 | 6/2014 | Williams et al. |
| 2014/0158070 | A1 | 6/2014 | Williams et al. |
| 2014/0158071 | A1 | 6/2014 | Svensson |
| 2014/0158072 | A1 | 6/2014 | Williams et al. |
| 2014/0158084 | A1 | 6/2014 | Fiveland et al. |
| 2014/0158100 | A1* | 6/2014 | Williams ............... F02M 26/06 123/568.21 |
| 2014/0163839 | A1 | 6/2014 | Staley et al. |
| 2014/0245993 | A1 | 9/2014 | Weber et al. |
| 2014/0261325 | A1 | 9/2014 | Scuderi et al. |
| 2014/0299097 | A1 | 10/2014 | Furukawa et al. |
| 2014/0311443 | A1* | 10/2014 | Leone ................. F02D 41/0025 123/25 R |
| 2015/0051809 | A1* | 2/2015 | Glugla ................... F02D 17/02 701/103 |
| 2015/0152780 | A1 | 6/2015 | Dale-Jones |
| 2015/0226159 | A1 | 8/2015 | Jayakar et al. |
| 2015/0308301 | A1 | 10/2015 | McConville et al. |
| 2016/0025031 | A1 | 1/2016 | Van Nieuwstadt et al. |
| 2016/0084149 | A1 | 3/2016 | Dale-Jones |

(56) References Cited

U.S. PATENT DOCUMENTS

| | | |
|---|---|---|
| 2016/0177854 A1 | 6/2016 | Gruber et al. |
| 2016/0265482 A1 | 9/2016 | Nagatsu et al. |
| 2016/0290220 A1 | 10/2016 | Smiljanovski et al. |
| 2016/0363070 A1 | 12/2016 | Hotta |
| 2016/0369717 A1 | 12/2016 | Brinkmann et al. |
| 2017/0022954 A1 | 1/2017 | Xiao et al. |
| 2017/0058821 A1* | 3/2017 | De Smet ............... F02B 37/183 |
| 2017/0122229 A1 | 5/2017 | Ossareh et al. |
| 2017/0130630 A1* | 5/2017 | Younkins .............. F01N 11/005 |
| 2017/0159581 A1* | 6/2017 | McCarthy, Jr. ..... F02D 13/0215 |
| 2017/0260916 A1 | 9/2017 | Kraemer et al. |
| 2018/0106204 A1* | 4/2018 | McCarthy, Jr. ..... F02D 41/1454 |
| 2018/0223757 A1* | 8/2018 | McCarthy, Jr. ......... F02D 17/02 |

FOREIGN PATENT DOCUMENTS

| | | |
|---|---|---|
| DE | 10107268 A1 | 8/2002 |
| JP | 4858646 B2 | 1/2012 |
| JP | 2013253500 A | 12/2013 |
| WO | WO-03048548 A1 | 6/2003 |
| WO | WO-2005/017335 A1 | 2/2005 |

OTHER PUBLICATIONS

International Search Report and Written Opinion for PCT/US2017/014199, dated Apr. 25, 2017; pp. 1-11.

* cited by examiner

IN-CYLINDER EGR AND VVA FOR AFTERTREATMENT TEMPERATURE CONTROL

PRIORITY

This is a continuation-in-part of U.S. application Ser. No. 15/541,365, filed Jun. 30, 2017 titled "IN-CYLINDER EGR FOR AIR FUEL RATIO CONTROL," which is a § 371 entry of PCT/US2017/014199 filed Jan. 19, 2017, which claims the benefit of priority of U.S. provisional patent application Ser. No. 62/280,552 filed Jan. 19, 2016, all of which are incorporated herein by reference. This application also claims the benefit of U.S. provisional application Ser. No. 62/570,052, filed Oct. 9, 2017 which is incorporated herein by reference.

FIELD

This application provides systems and methods for utilizing exhaust gas recirculation in-cylinder to tailor the air fuel ratio of an engine.

BACKGROUND

Cylinder deactivation (CDA; deactivation of intake valve, exhaust valve, and fueling) improves fuel economy at low load and idle by reducing losses affiliated with the otherwise low use cylinders. When using CDA on cylinders, the normal operating cylinders have their fuel increased or their air to fuel ratio (AFR) lowered to make up for the torque missing from the CDA cylinders.

Exhaust gas recirculation (EGR) techniques duct exhaust gas from some point after the exhaust manifold back to the intake manifold. EGR is useful for burning pollutants and for adjusting the AFR of combustion. External circuits lose heat and are subject to leakage.

SUMMARY

The system and methods disclosed herein overcome the above disadvantages and improves the art by way of a system and method aftertreatment temperature management in a multiple-cylinder engine, comprising a multiple-cylinder engine comprising respective reciprocating pistons in multiple cylinders, the respective reciprocating pistons connected to a crankshaft for rotation of the crankshaft, a computer-controllable fuel injection system configured to inject fuel in to the multiple cylinders, and respective computer-controllable intake valves and exhaust valves for opening and closing the multiple cylinders. A computer control network is connected to the multiple-cylinder engine, the computer control network comprising one or more processors, a tangible memory device, and processor-executable control algorithms, which, when executed by the one or more processors, implements aftertreatment temperature management. The one or more processors are configured to sense a power output request for the engine and an aftertreatment temperature, determine an aftertreatment temperature-efficient air to fuel ratio that satisfies the sensed power output request, sense a current air to fuel ratio in one or both of an intake manifold connected to the engine and an exhaust manifold connected to the engine, determine an air to fuel ratio adjustment by processing the determined aftertreatment temperature-efficient air to fuel ratio and by processing the sensed current air to fuel ratio, select an in-cylinder exhaust gas recirculation technique based on the determined air to fuel ratio adjustment, wherein the in-cylinder exhaust gas recirculation technique adjusts an oxygen and particulate content of exhaust gas resulting from combustion, select at least one EGR cylinder of the multiple-cylinder engine to implement the in-cylinder exhaust gas recirculation technique, select at least one cylinder of the multiple-cylinders to satisfy the sensed power output request, control the at least one cylinder to satisfy the sensed power output request, and control the intake valves to open and the exhaust valves to close for the selected at least one EGR cylinder to adjust the oxygen and particulate content of the exhaust gas by applying at least a second compression stroke of the respective reciprocating piston of the at least one EGR cylinder to the exhaust gas to push the exhaust gas through to the intake manifold.

The processor-executable control algorithms can further cause the one or more processors to adjust fuel injection by the fuel injection system based on the selected in-cylinder exhaust gas recirculation technique.

Adjusting fuel injection to the multiple-cylinders can comprise increasing fuel injection to the at least one cylinder of the multiple-cylinders to increase a torque output of the combustion cylinders.

Adjusting fuel injection can comprise terminating fuel injection to the at least one EGR cylinder.

Adjusting fuel injection can comprise terminating fuel injected in to the at least one cylinder.

Controlling the at least one cylinder to satisfy the sensed power output request can comprise implementing cylinder deactivation mode on the at least one cylinder.

Selecting the in-cylinder exhaust gas recirculation technique can comprise selecting among a reverse-breathing mode and a re-breathing mode.

Selecting the in-cylinder exhaust gas recirculation technique can comprise selecting two in-cylinder exhaust gas recirculation techniques to implement simultaneously on different cylinders of the multiple cylinders.

The processor-executable control algorithms can further cause the one or more processors to implement a cylinder deactivation mode to deactivate fuel injection, intake valve actuation and exhaust valve actuation for at least one stroke cycle of the reciprocating pistons, wherein a stroke cycle comprises from two to sixteen strokes of the reciprocating pistons within their respective cylinders.

The processor-executable control algorithms can further cause the one or more processors during the cylinder deactivation mode to reactivate fuel injection by the fuel injection system to the selected number of cylinders after a respective piston stroke from bottom dead center to top dead center in the selected number of cylinders without opening either of the respective intake valves or the respective exhaust valves for the selected number of cylinders.

The processor-executable control algorithms can implement the in-cylinder exhaust gas recirculation technique comprising a reverse-breathing mode configured to adjust timing of respective exhaust valve actuation for the selected number of cylinders to correspond with piston travel in the selected number of cylinders such that the exhaust valves for the selected number of cylinders open when respective reciprocating pistons travel from top dead center to bottom dead center in the selected number of cylinders so as to draw exhaust from an exhaust manifold in to the selected number of cylinders; and adjust timing of respective intake valve actuation for the selected number of cylinders to correspond with piston travel in the selected number of cylinders such that the respective intake valves open when respective reciprocating pistons travel from bottom dead center to top dead center in the selected number of cylinders.

The processor-executable control algorithms can further cause the one or more processors during the reverse-breathing mode to pump exhaust through the selected number of cylinders in a two-stroke cycle, and wherein the second compression stroke corresponds to respective reciprocating pistons traveling from bottom dead center to top dead center in the selected number of cylinders.

Controlling the at least one cylinder to satisfy the sensed power output request can comprise implementing a late intake valve closing technique on the at least one cylinder.

Controlling the at least one cylinder to satisfy the sensed power output request can comprise implementing cylinder deactivation technique on at least a second cylinder.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
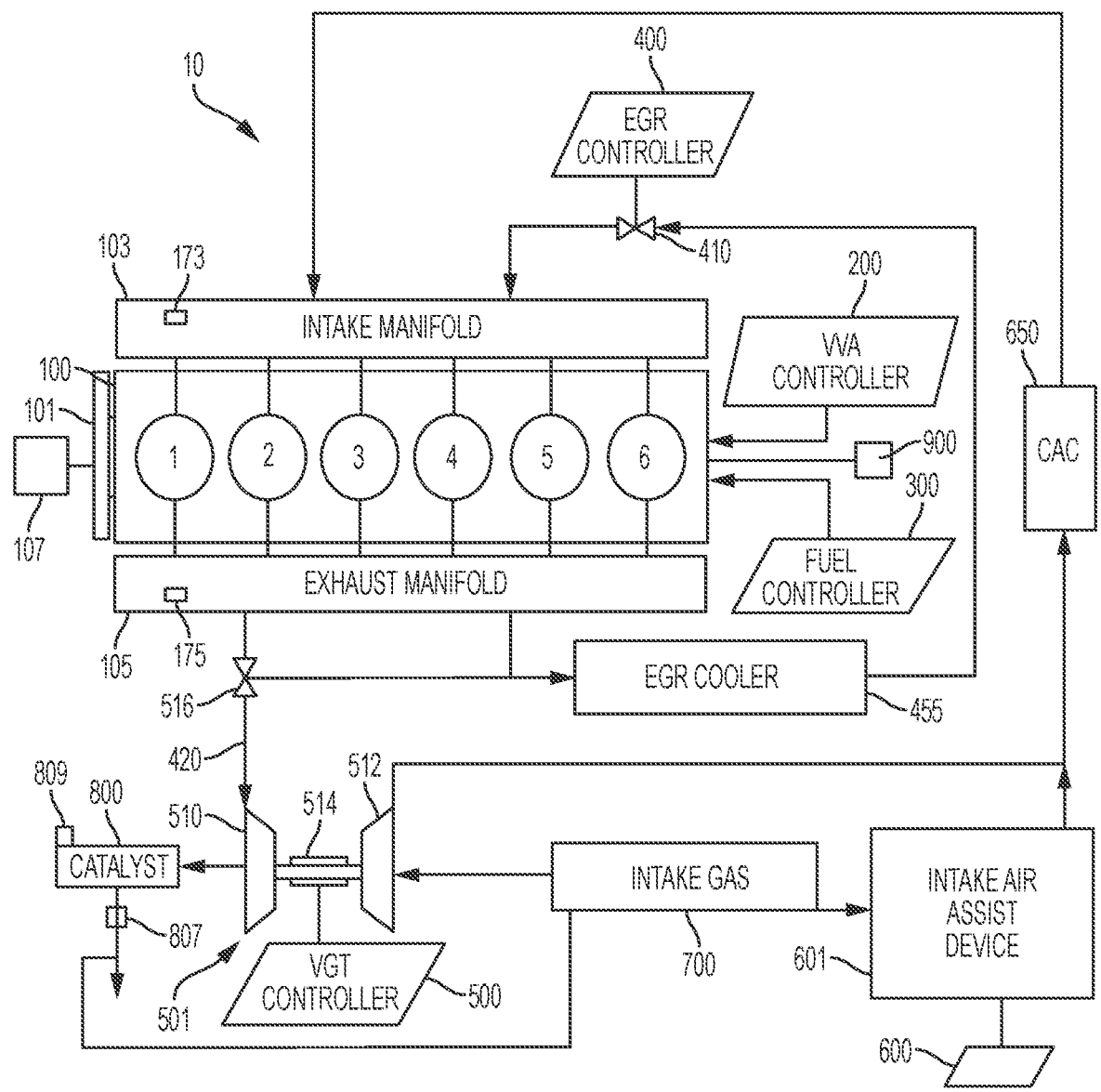
FIG. 1 is a schematic for an engine system.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. Phrases such as "upstream" and "downstream" are used to assist with directionality of flow from a fluid input point to a fluid output point. Fluids in this disclosure can comprise a variety of compositions, including fresh or ambient air, exhaust gas, other combustion gasses, vaporized fuel, catalyzing agents such as urea, among others. This disclosure primarily focusses on diesel engine operation, but tenets of the disclosure can be applied to other fueled engines and engine systems, including those fueled by biofuels and other petroleum products such as gasoline, and including hybrid-electric vehicles.

A diesel engine cylinder deactivation system 10 comprises a multiple cylinder diesel engine 100 comprising at least one respective intake valve 130 and at least one respective exhaust valve 150 for each of the multiple cylinders 1-6. An intake manifold 103 is for distributing fluid flow across the cylinders 1-6. An exhaust manifold 105 is for collecting or distributing exhaust across the cylinders 1-6. A valve control system comprising a variable valve actuation (WA) controller 200 is connected to selectively deactivate a respective intake valve 130 and a respective exhaust valve 150 for a selected cylinder 1-6 of the multiple cylinder diesel engine 100. A fuel injection control system comprising a fuel controller 300 is connected to selectively deactivate fuel injection to the selected cylinder while increasing fuel to firing cylinders. The multiple cylinder diesel engine 100 enters a cylinder deactivation mode whereby the valve control system, comprising VVA controller 200 deactivates the respective intake valve and the respective exhaust valve for the cylinder while continuing to fire other cylinders of the multiple cylinder diesel engine. The fuel injection control system deactivates fuel injection to the cylinder while adjusting fuel to the firing cylinders. The manifolds and VVA controller 200 are used to tailor air flow through the cylinders 1-6.

Figure 4:
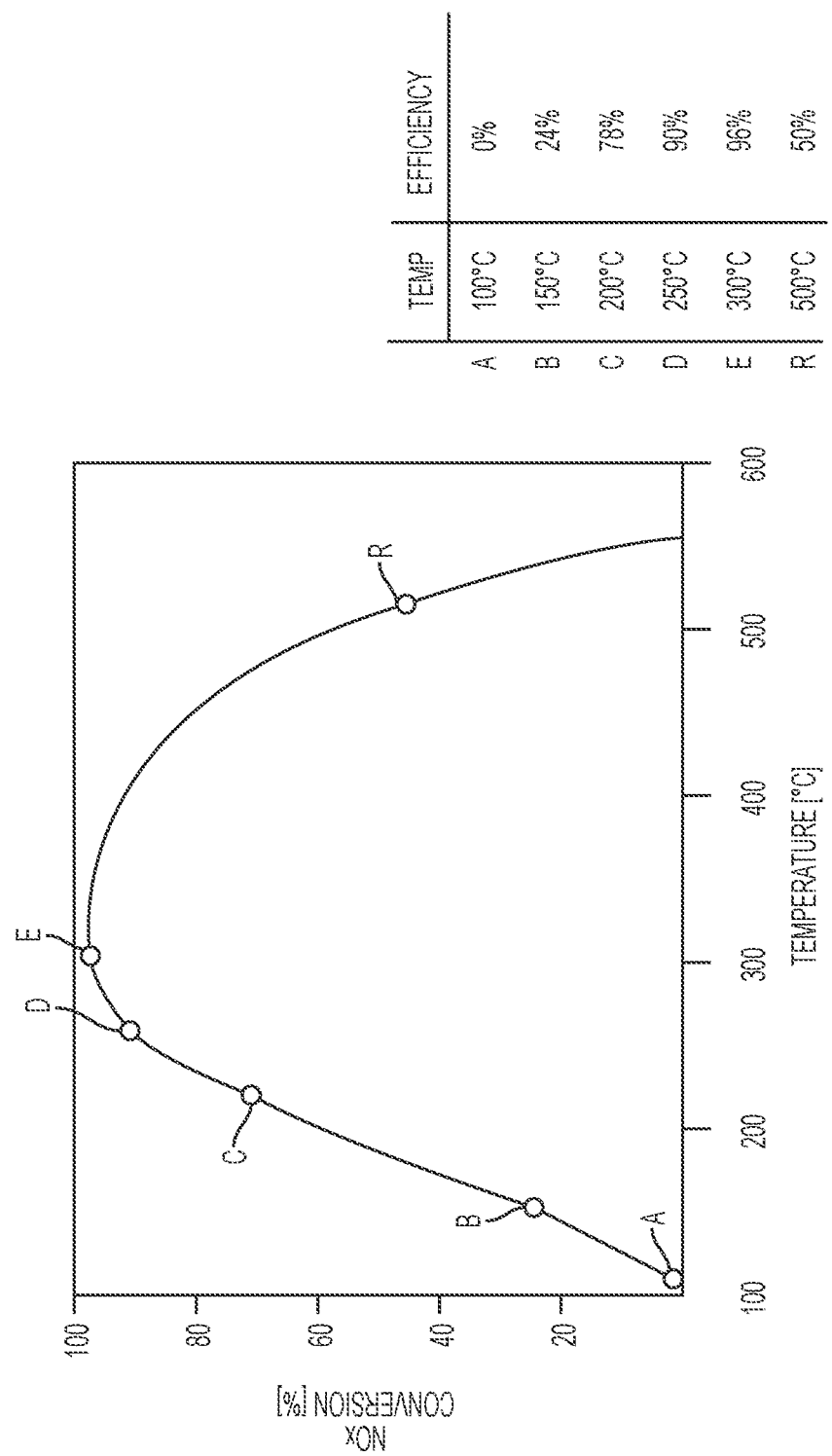
FIG. 4 shows catalyst efficiency for an example catalyst.

In a first aspect, decreasing the time to heat the catalyst 800 is advantageous for many vehicles, especially medium and heavy duty diesel machinery. Most off-highway machinery cannot meet current FTP (Federal Testing Procedure) NOx requirements because the majority of their operation time is spent at low load, resulting in low temperature exhaust gasses. FIG. 4 shows one example of catalyst efficiency for a catalyst 800. Adjusting the filtration materials of the catalyst 800 will shift the illustrated line. For the example, the catalyst 800 has a "bed" of material through which the exhaust gases 420 pass. The heat of that "bed" impacts the efficiency of the pollution capture. Nitric and Nitrous Oxides (NOx) is the target pollutant of FIG. 4. Other pollutants, such as Sulphur or hydrocarbons can be target pollutants, among others. At 100 degrees Centigrade, the catalyst is 0% efficient to capture NOx (point A). At 150 degrees, the catalyst converts only 24% NOx (point B). Raising the exhaust temperature to 200 degrees Centigrade (point C) brings NOx conversion efficiency up to 78%, with 90% efficiency at 250 degrees (point D) and 96% efficiency at 300 degrees Centigrade (point E). For the example catalyst, it is therefore ideal to have an exhaust temperature near 300 degrees Centigrade. The thermal management techniques disclosed herein drastically reduce the time to bring the catalyst 800 to an efficient pollution-filtering temperature.

For example, many off-highway vehicles fail to meet Federal Testing Procedure (FTP) standards because they take 7 to 20 minutes to reach an efficient temperature, if at all. Using the on-demand techniques disclosed herein, CDA mode, reverse-breathing mode, re-breathing mode, or combinations thereof can be implemented to generate heat very quickly. Instead of 7 to 20 minutes, a catalyst 800 can reach an efficient pollution filtering temperature in 10 to 550 seconds, more preferably, within 10-90 seconds, or within 90-180 seconds. Additional achievable time ranges for heating an aftertreatment device to a target temperature, such as at or above 250 degrees Centigrade, can depend upon material selection of the catalyst bed, fuel type, catalyzing agent use, among others.

Material selection limits at what temperature the catalyst is efficient, at what temperature the catalyst is ruined via sintering effects, and at what temperature the catalyst can conduct diesel particulate regeneration (DPR) at point R. FIG. 4 shows that at a regeneration temperature of 500 degrees Centigrade, the catalyst is only 50% efficient at capturing NOx. Commensurate with conducting diesel particulate regeneration of the catalyst 800, it is possible to run a timer. When an exhaust time exceeding a time threshold is sensed, the computer controller 1400 can execute control programming to enter a diesel particulate regeneration mode by implementing the increased heat output mode.

Ordinarily, the temperature of the exhaust can vary based on the rotations per minute (RPM) of the crankshaft 101 and based on the engine load. Many vehicles, such as busses and off-highway vehicles only achieve an efficient pollution management temperature when they are being transported via highway; but, not during slower operation modes. When implementing an exhaust temperature management method disclosed herein, a large amount of the engine operating range can result in an exhaust temperature that makes catalyst 800 operate to filter pollution efficiently, at any crankshaft RPMs, and at any engine load.

Using a cylinder to combust fuel at an optimal air to fuel ratio (AFR) emits a higher temperature exhaust stream. The fuel efficiency for the optimal AFR combustion is quite high, and the torque output is high. Cutting fuel to some of the cylinders and closing affiliated valves permits heat generation via a combustion stroke on the closed cylinder. Heating a charge in this manner removes the pollution of combustion from some of the cylinders and increases the overall fuel economy.

Turning to FIG. 1, a schematic for an engine system 10 is shown. An engine 100 comprises 6 cylinders 1-6. Other numbers of cylinders can be used, but for discussion, 4 or 6 cylinders are illustrated. The cylinders 1-6 receive intake gases, which is combustible gas, such as air, or air mixed with exhaust (exhaust gas recirculation "EGR"), from the intake manifold 103. One or more of an intake manifold sensor 173 can monitor the pressure, flow rate, oxygen content, exhaust content or other qualities of the intake fluid. The intake manifold 103 connects to intake ports 133 in the engine block to provide intake fluid to the cylinders 1-6. In a diesel engine, the intake manifold 103 has a vacuum except when the intake manifold is boosted. CDA is beneficial, because the cylinder can be closed. Fuel efficiency is gained by not drawing the piston down against the manifold vacuum. When the cylinder is deactivated, the crankshaft 101 has less resistance from the piston, and the crankshaft can output more torque from the firing cylinders.

Fuel is injected to individual cylinders via a fuel injection controller 300. The fuel injection controller 300 can adjust the amount and timing of fuel injected in to each cylinder and can shut off and resume fuel injection to each cylinder. The fuel injection for each cylinder 1-6 can be the same or unique for each cylinder 106, such that one cylinder can have more fuel than another, and one cylinder can have no fuel injection, while others have fuel.

A user input sensor 900 can be linked to the engine system 10 to sense user inputs such as braking, acceleration, start-up mode selection, shut-down mode selection, auxiliary device activation, among others. The user selections can impact the load requirements for the engine system 10, and the power settings for the cylinders 1-6 can be adjusted in response to the user selections. The valve control by WA controller 200 and fuel injection from fuel controller 300 can be tailored based on the user selections sensed by user input sensor 900. When the thermal management program is pre-programmed, and real time temperature sensing is not required for all operating conditions, it is possible to implement certain thermal management engine cycle patterns based on a user input or other data point collected by sensors other than thermal sensors. For example, if a certain load is placed on the engine 100, it is possible to pre-program that the temperature of the exhaust will be too hot or too cold, and to implement changes to the operational modes without thermal feedback, per se.

A variable valve actuator (WA) controller 200 also couples to the cylinders 1-6 to actuate intake valves 130 and exhaust valves 150. The VVA controller 200 can change the actuation of intake valves 130 and exhaust valves 150 so as to open or close the valves normally, early, or late, or combinations thereof such as in negative valve overlap, or cease operation of the valves. VVA controller 200 can cooperate with a valve actuator 185, such as a hydraulic, electric, or electric solenoid system to control the intake and exhaust valves 130, 150. The valve actuators 185 for each cylinder 1-6 can be the same for all cylinders 106, thus enabling each valve of each cylinder to switch between combustion mode, deactivated mode, reverse-breathing mode or re-breathing mode. Or, the valve actuators 185 can differ between the intake valves 130 and the exhaust valves 150, so that certain functionality is only enabled on one or the other of those valves. Or, commensurate with below discussions, the functionality can be distributed so that some valves can switch between combustion mode and deactivated mode, while others can switch between combustion mode and reverse-breathing or re-breathing mode. And, when more than one intake valve or more than one exhaust valve are used per cylinder 106, the valve actuators 185 can be the same or different for each of those valves.

In later figures, plenums can be included to further tailor distribution of gasses in the intake manifold 103 and the exhaust manifold 105. The need for, and placement of intake manifold sensors 173 and exhaust manifold sensors 175 can depend upon the use and placement of plenums and the placement of cylinders equipped to implement CDA mode, rebreathing mode or reverse-breathing mode. The mode chosen for a cylinder impacts the heat output for that cylinder, so plenums and related sensors can be arranged to sense and direct specific heat outputs along exhaust circuits designed for the engine's chosen modes. So, the illustrated arrangements are examples, only, and other circuits can be utilized.

Figure 3B:
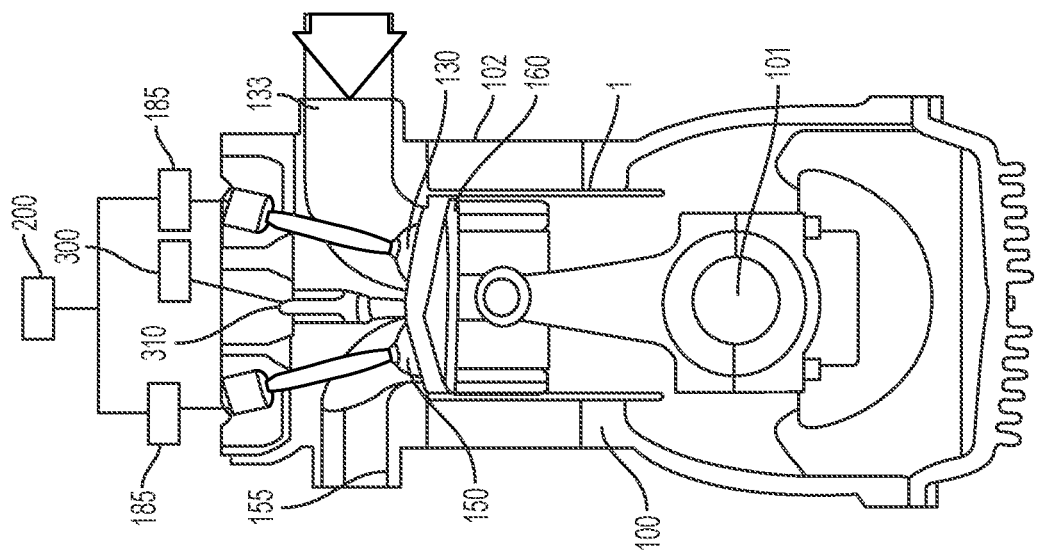
FIGS. 3A-3C show aspects of engine cylinders.
Figure 3A:
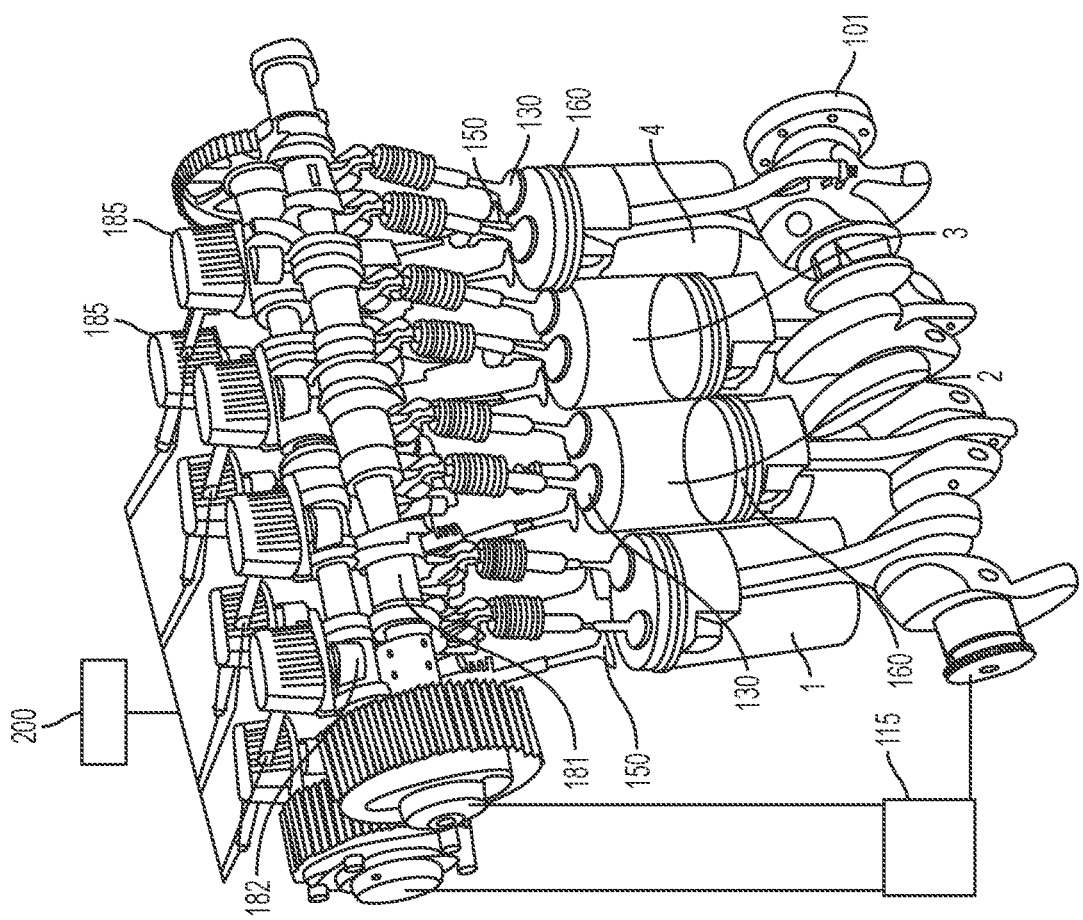

The engine 100 can be cam or camless, or a hybrid "cam-camless WA." So, the intake valves 130 and exhaust valves 150 can either couple to a cam system for actuation, such as the camshafts 181, 182 example of FIG. 3A, a hydraulic rail, a latched rocker arm, other rocker arm, switching roller finger follower, lashed capsule, an electric actuator, a hydraulic actuator, or electro-hydraulic actuator, etc. Additional functionality, such as engine braking and hydraulic lash adjustment can be included. It is possible to use a rocker arm lost motion capsule with reset to modularly perform HLA and braking. Other designs can include HLA and engine brake in a cam or camless engine.

As an alternative to that depicted, a camless direct acting mechanism can selectively operate the individual valves to open and close the cylinders.

Figure 3C:
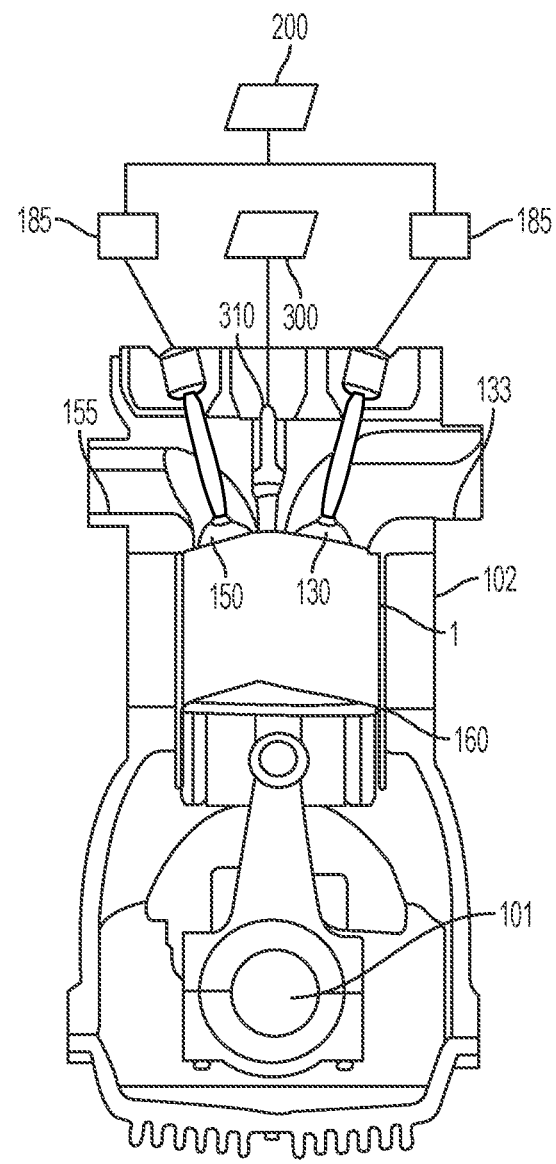

The crankshaft 101 can be coupled to transfer energy between the crankshaft 101 and the camshafts 181, 182 as by a torque transfer mechanism 115, which can comprise gear sets, belts, or other transfer mechanisms. While FIGS. 3B &3C show one intake valve 130 and one exhaust valve 150, it is possible to have two intake valves 130 and two exhaust valves 150 per each cylinder, as in FIG. 3A. The engine block 102 is removed for the example of FIG. 3A for clarity, and the cylinders are shown in broken lines.

A diesel engine works by compressing intake fluid in a cylinder 1-4 using a piston 160. Once the intake fluid has moved from the intake manifold 103 to the cylinder, it can be referred to as a "charge," and when the charge moves from the cylinder to the exhaust manifold 105, it can be referred to as exhaust gas.

In a combustion mode, fuel is injected via fuel injector 310. The high heat and compression ignites the fuel, and combustion forces the piston from top dead center (TDC) shown in FIG. 3B to bottom dead center (BDC) shown in FIG. 3C. Torque is directed to the crankshaft 101 for output on an affiliated flywheel. In diesel engines, this is referred to as "compression-ignition." To combust in a gasoline engine, a spark plug is included to ignite the gasoline. So, to adapt the disclosure herein to gasoline engines, an additional spark plug controller and control algorithms would be included to control the timing of an included spark plug.

Figure 5A:
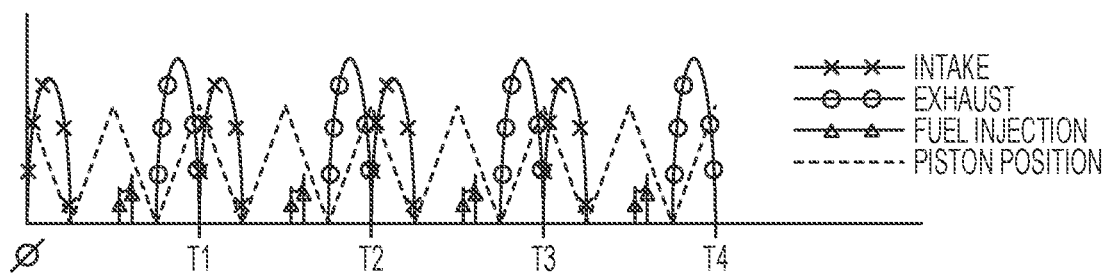
FIGS. 5A-5J show amplitude profiles for valve actuations & fuel injections with piston positions over time.

Diesel operation can be referred to as "4 stroke," though other operation modes such as 2-stroke, 6-stroke, and 8-stroke are possible and known in the art. In 4-stroke, the piston moves from TDC to BDC to fill the cylinder with intake fluid (stroke 1). The start of the cycle is shown in FIGS. 3B and 5A, and FIG. 3C shows the end of stroke 1, when the cylinder is full of intake fluid. The piston rises back to TDC (stroke 2). Fuel is injected and ignites to push the piston 160 to BDC (stroke 3). The piston rises again to TDC to expel the exhaust out the exhaust valve (stroke 4). The intake valve 130 is open during stroke 1 and closed during strokes 2-4, though the WA 200 can adjust the timing of opening and closing. The exhaust valve 150 is open during stroke 4 and closed during strokes 2-4, though the WA 200 can adjust the timing of opening and closing. Compression occurs on the second stroke, and combustion occurs on the third stroke. 6-stroke and 8-stroke techniques include additional aspects of compression and injection after the intake valve has closed and prior to the exhaust valve opening. The application will discuss 4-stroke combustion techniques in detail, but where compatible, the 4-stroke combustion techniques can be applied to augment art-recognized 6-stroke or 8-stroke combustion techniques. 2-stroke engine-braking techniques can be used with 2-, 4-, 6- or 8-stroke combustion techniques.

In normal operation, exhaust gases leave cylinders through exhaust ports 155 in engine block 102. Exhaust ports 155 communicate with an exhaust manifold 105. An exhaust manifold sensor 175 can monitor the pressure, flow rate, oxygen content, nitrous or nitric oxide (NOx) content, sulphur content, other pollution content or other qualities of the exhaust gas. Exhaust gas can power a turbine 510 of turbocharger 501, which can be a variable geometry turbocharger (VGT) or other turbocharger. The turbocharger 501 can be controlled via a turbocharger controller 500 to adjust a coupling 514 between the turbine 510 and the compressor 512. The turbocharger 501 can be adjusted so as to control intake or exhaust flow rate or back pressure in the exhaust. A controllable valve 516 can be included to direct timing and quantity of fluid to the turbine 510 and catalyst 800 or to an optional EGR cooler 455 and EGR circuit that returns exhaust gases to the intake manifold for out-of-cylinder exhaust gas recirculation.

Exhaust gas can be filtered in an aftertreatment system comprising catalyst 800. At least one exhaust sensor 807 is placed in the aftertreatment system to measure exhaust conditions such as tailpipe emissions, NOx content, exhaust temperature, flow rate, etc. A catalyst sensor 809 can be included to monitor specific aspects of temperature and content of the catalyst 800. The exhaust sensor 807 and catalyst sensor 809 can comprise more than one type of sensor, such as chemical, thermal, optical, resistive, velocity, pressure, etc. A sensor linked with the turbocharger 501 can also be included to detect turbine and compressor activity.

Exhaust can exit the system after being filtered by the at least one catalyst 800. Or, exhaust can be redirected to the intake manifold 103. An EGR controller 400 actuates an EGR valve 410 to selectively control the amount of EGR supplied to the intake manifold 103. EGR controller 400 can be connected to control valve 516, or the intake assist controller 600 can be connected to control the valve 516. The exhaust recirculated to the manifold 103 impacts the air fuel ration (AFR) in the cylinder. Exhaust dilutes the oxygen content in the manifold 103. Unburned fuel from the fuel doser, or unburned fuel remaining after combustion increases the fuel amount in the AFR. Soot and other particulates and pollution gases also reduce the air portion of the air fuel ratio. While fresh air brought in through the intake system 700 can raise the AFR, EGR can lower AFR, and fuel injection to the cylinders can lower the AFR further. Thus, the EGR controller 400, fuel injection controller 300 and intake assist controller 600 can tailor the air fuel ratio to the engine operating conditions by respectively operating valve 516, EGR valve 410, fuel injector 310, and intake assist device 610. So, adjusting the air fuel ratio to a firing cylinder can comprise one of boosting fresh air from intake system 700 to the at least one firing cylinder by controlling an intake air assist device 601, such as a supercharger, or decreasing air fuel ratio to a firing cylinder by boosting with exhaust gas recirculation to the firing cylinder. A charge air cooler 650 can optionally be included to regulate intake flow temperature. This can be done with or without augmenting with a turbocharger 501. Numerous alternative arrangements are possible for controlling air fuel ratio and other sub combinations and combinations of exhaust gas recirculation, turbocharging and supercharging are possible.

Additionally, terminating fuel injection to one or more cylinders 1-6 adjusts the air fuel ratio of exhaust gas, and deactivating a cylinder decreases the quantity of exhaust. Cylinder deactivation impacts the ability to power the turbine 510 to run the compressor 512. Implementing engine braking, re-breathing, and reverse breathing also impacts the quantity and composition of exhaust gasses.

Figure 2:
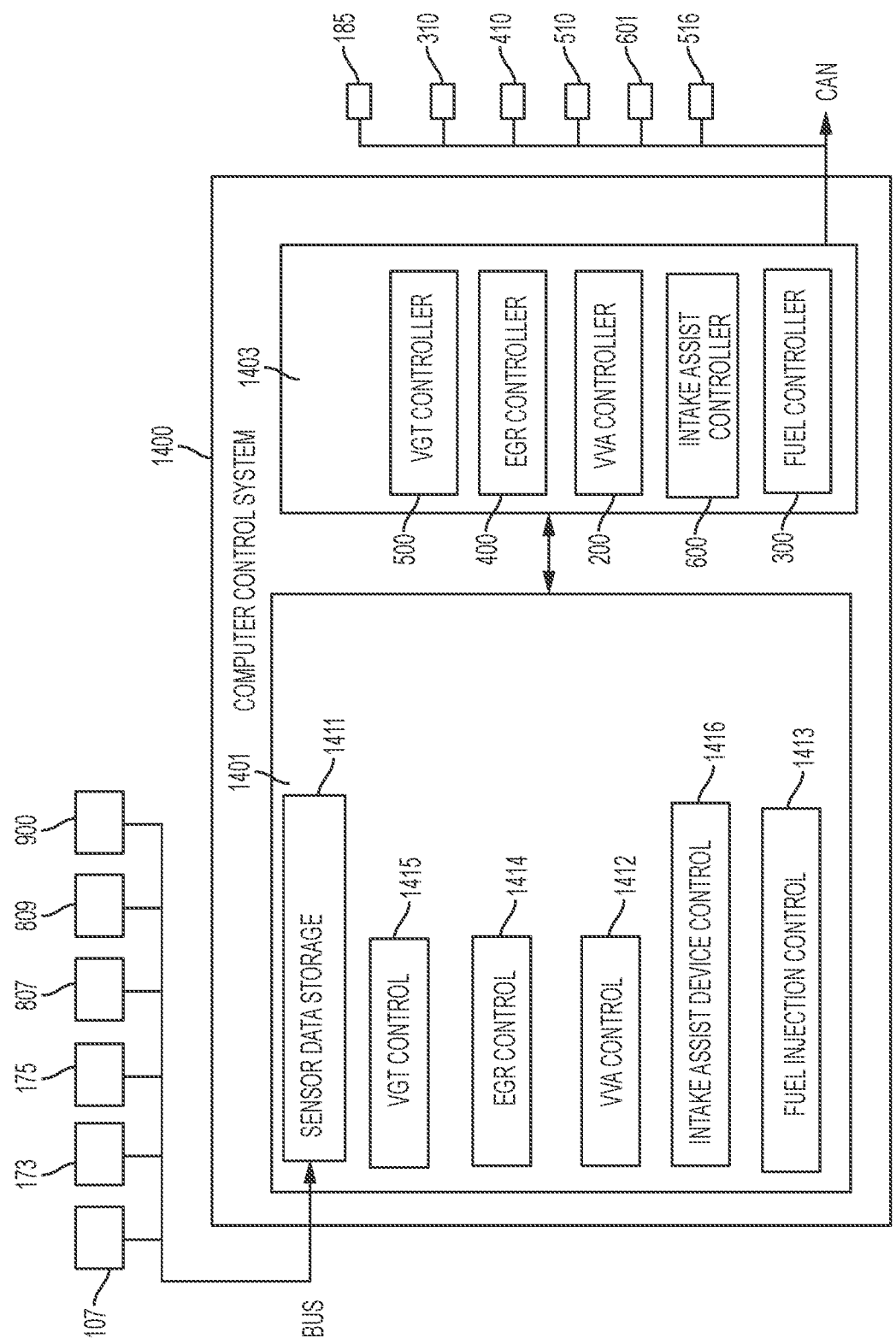
FIG. 2 is a schematic for a computer control network.

A computer control network is outlined in FIG. 2, and is connected to fuel injector 310 of fuel injection system and valve actuators 185 for respective intake valves and respective exhaust valves. When included, the computer control system is connected to optional EGR valve 410, variable geometry turbine 510, and intake assist device 601. The network can comprise a BUS for collecting data from various sensors, such as crankshaft sensor 107, intake manifold sensor 173, exhaust manifold sensor 175, exhaust sensor 807, catalyst sensor 809, user input sensor 900, etc. The sensors can be used for making real-time adjustments to the fuel injection timing and quantity and valve opening and closing timing. Additional functionality can be pre-programmed and stored on the memory device 1401. The additional functionality can comprise pre-programmed thresholds, tables, and other comparison and calculation structures for determining power settings for the cylinders, durations for the power settings and number and distribution cylinders at particular power settings. For example, a sensed vehicle start up selection, accessory selection, gear selection, load selection or other sensor feedback can indicate that an exhaust temperature is or will be too low. In addition to temperature thresholds for entering and exiting thermal management strategies, it is possible to apply load thresholds. Load thresholds are particularly useful for determining the power setting aspects outlined below, though it is possible to provide real-time calculations via the computer controller 1400.

Memory device 1401 is a tangible readable memory structure, such as RAM, EPROM, mass storage device, removable media drive, DRAM, hard disk drive, etc. Signals per se are excluded. The algorithms necessary for carrying out the methods disclosed herein are stored in the memory device 1401 for execution by the processor 1403. When optional variable geometry turbocharger control is implemented, the VGT control 1415 is transferred from the memory 1401 to the processor for execution, and the computer control system functions as a turbocharger controller. Likewise, the computer control system 1400 implements stored algorithms for EGR control 1414 to implement an EGR controller 400; implements stored algorithms for intake assist device control 1416 to implement intake assist controller 600; and implements stored algorithms for fuel injection control 1413 to implement fuel injection controller 300. When implementing stored algorithms for WA control 1412, various intake valve controller and exhaust valve controller strategies are possible relating to valve timing and valve lift strategies, as detailed elsewhere in this application, and these strategies can be implemented by WA controller 200. The processor can combine outputs from the various controllers, for example, the processor can comprise additional functionality to process outputs from VGT controller 500 and intake assist controller 600 to determine a command for valve 516. A controller area network (CAN) can be connected to appropriate actuation mechanisms to implement the commands of the processor 1403 and various controllers.

While the computer control system 1400 is illustrated as a centralized component with a single processor, the computer control system 1400 can be distributed to have multiple processors, or allocation programming to compartmentalize the processor 1403. Or, a distributed computer network can place a computer structure near one or more of the controlled structures. The distributed computer network can communicate with a centralized computer control system or can network between distributed computer structures. For example, a computer structure can be near the turbocharger 501 for VGT control 500, another computer structure can be near the EGR valve 410 for EGR controller 400, another computer structure can be near the intake and exhaust valves for variable valve actuator 200, yet another computer controller can be placed for fuel injection controller 300, and yet another computer controller can be implemented for intake assist controller 600. Subroutines can be stored at the distributed computer structures, with centralized or core processing conducted at computer control system 1400.

The computer network comprises the processor 1403, at least one tangible memory device 1401, and processor-executable control algorithms for implementing the methods disclosed herein stored in the memory device 1401 and executable by the processor 1403. The stored processor-executable control algorithms implement the disclosed methods.

Cylinder Deactivation

Diesel cylinder deactivation (CDA) differs from gasoline CDA in many ways. In gasoline, a cylinder can be shut off for long periods of time. But a gasoline engine has trouble managing the use of both fresh and exhaust streams because of the O2 sensor that controls the fuel. In diesel, there are more cycle options as combustion can take place with a greater range of air to fuel ratios.

Cylinder deactivation is defined as turning off the intake valve, exhaust valve, and fuel injection to a cylinder. This differs from "cylinder cut-out," which merely turns off fuel injection, but leaves the valves in motion.

Closing the intake valves 130 and exhaust valves 150 prevents fluid-flow through the cylinder, prevents the cylinder from robbing resources allocated to the other active cylinders, and prevents energy drain to activate the valves. However, friction losses and leakage still occurs. So it is beneficial to use the cylinders from time to time to recharge the pressure in the cylinder to bias the oil that lubricates the cylinder back towards the oil pan. Otherwise, the oil contaminates the engine. Other benefits inure, such as airflow control and temperature control.

This leads to strategies to adjust the fuel ratio at each cylinder during activation and deactivation. While CDA can be entered and exited in one cam revolution (or electronically switched) it is an on-demand system. However, air boost ramps up and pressure dissipates in the manifold at a different rate, and is less "on-demand." The fuel supply must also be adjusted to deviate injection pressures to individual cylinders.

The use of the below strategies can vary based on the power demands of the engine. Decision trees can help decide how long to stay in CDA, and to decide what procedures to use to extend CDA across different loads and engine speeds.

FIG. 5A illustrates power demands over time for actuating an intake valve 130, fuel injection 310, and an exhaust valve 150 for one of the cylinders 1-6. A respective piston 160 reciprocates within a respective cylinder 1-6 from top-dead center (TDC) to bottom-dead center (BDC). FIG. 5A simplifies the issue of whether variable valve actuation is used (LIVO, LIVC, etc.), and repeats the same valve lift and fuel injection patterns for each cylinder cycle. Overlaps between valve openings and closings are not drawn, though in practice, the intake valve can begin opening while the exhaust valve is still closing. Variants for contrasting techniques for "swirl," "cylinder wetting," "churn," "scavenging," etc. are not shown, though such techniques can be used, as can other combustion techniques.

From time zero T0 to time T1, the cylinder completes a four stroke cycle. The timeline starts with the piston for this cylinder near TDC after an exhaust stroke. The piston position is overlaid in broken lines to show the piston position relative to the power demands. Stroke 1 moves the piston from TDC to BDC while the intake valve opens to induct intake gases. In some cases, the piston can begin travelling back to TDC before the intake valve 130 has closed all the way, but stroke 2 is a compression stroke, as the piston pushes up against closed intake valve 130 and closed exhaust valve 150. Fuel injection occurs at or near TDC. When the fuel is diesel, the thermodynamics of the compression ignites the fuel and the piston 160 moves from TDC to BDC on stroke 3, also called a power stroke. The power of the fuel is converted to torque power by transfer of energy from the piston 160 to the crankshaft 101. The exhaust valve can begin to open at or near BDC of stroke 3. As the piston returns to TDC, the cylinder contents exit past the exhaust valve 150.

In-Cylinder Exhaust Gas Recirculation

One strategy uses cylinder deactivation to capture a hot charge to permit exhaust gas recirculation in-cylinder. The exhaust valve is opened during a stroke preceding stroke S1 to empty the cylinder. Then, the intake valve is opened to receive intake gasses in stroke S1. Fuel is injected near the apex between strokes 2 & 3, then the fuel is combusted. The power stroke S3 transfers energy to the crankshaft 101. The exhaust valve is deactivated and the charge is not released in stroke S4. The piston continues to reciprocate. This can be seen in FIG. 5B.

Such a mode is useful when the engine is in a very low power condition. When the torsional jerks can be accounted for, the mode can be used at higher power levels.

The technique outputs exhaust, but fresh air does not get pushed through the engine. This is useful during a heat-up mode to increase the cylinder temperatures and ultimately the exhaust temperatures, as when CDA mode is used to heat an aftertreatment system. Using in-cylinder EGR in this way ensures all fuel is combusted, provides heat to the engine block, making subsequent combustions more efficient, and exhausts higher temperature exhaust towards the aftertreatment for more efficient pollution capture. The in-cylinder EGR mode can be terminated when further heating of the cylinder is not necessary, as when a cylinder heat threshold is reached. The strategy is also useful when no fresh air is wanted in the EGR circuit, such as in low AFR operating ranges. Preventing pass-through of fresh air during CDA mode, as by this hot charge capture, is beneficial to avoid diluting the EGR circuit. The content of the EGR exhaust flow can be maintained to a desired pollutant level to permit capture of certain particulates, for burn-off of certain particulates, or for efficient cylinder operation as by AFR tailoring. With proper control of the level of fuel injected to the cylinder, there can be no fuel remainder and no oxygen remainder in resulting exhaust gases from the deactivated cylinder.

Figure 5B:
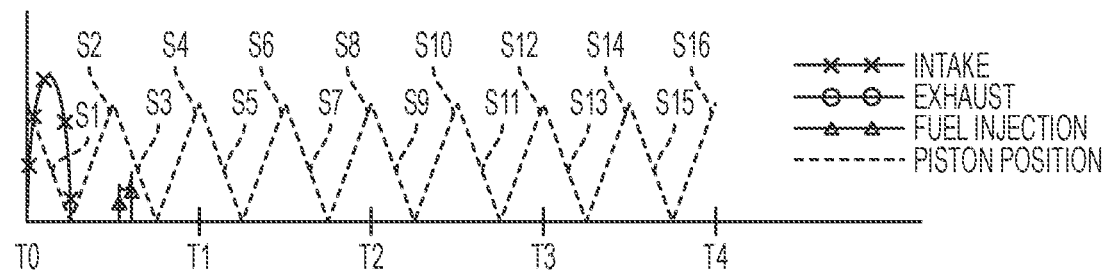
Figure 5C:
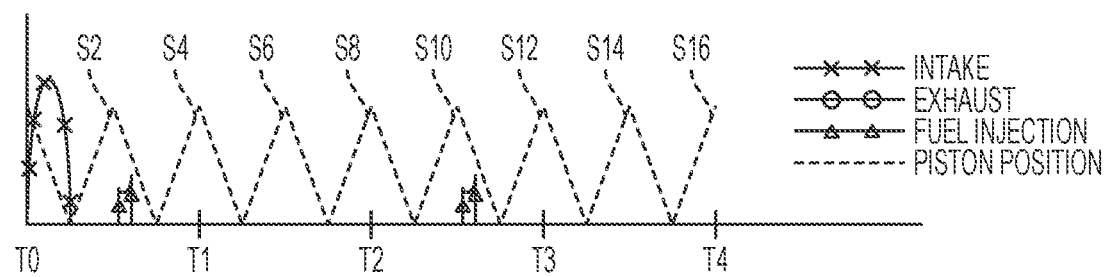

FIG. 5B shows a technique to transition from the 4-stroke mode shown in FIG. 5A to a CDA mode having in-cylinder EGR. But, FIG. 5C shows a technique for transitioning to a CDA mode having sustained in-cylinder EGR in an 8-stroke mode. In both FIGS. 5B & 5C, the intake valve opens during stroke S1 and fuel is injected as part of stroke S2. The power stroke S3 is followed by no exhaust valve opening during stroke S4. In FIG. 5B, strokes S5-S8 have no corresponding intake valve actuation, fuel injection, or exhaust valve actuation, as the cylinder is in cylinder deactivation mode. Any remaining oxygen or fuel can be spent via combustion-ignition at the peaks of subsequent compressive strokes from BDC to TDC, such as near peaks for strokes S6, S8, etc.

The exhaust gases corresponding to FIG. 5B are quite hot when they are let out due to the multiple compression strokes. In an electronically-actuated valve system, the exhaust valve can be opened during an even stroke, such as stroke S6, S8, S10, S12 etc. In a cam-actuated system, it is convenient to use a single cam lobe profile and single cam rail for the exhaust valve, and so it is convenient to open the exhaust valve around strokes S8, S12 or S16. Permitting an additional compression stroke on the combusted gases heats the cylinder block of the engine 100 and heats the exhaust. Timing the release of the additionally compressed exhaust gas becomes part of the thermal management strategies outlined herein. The timed release also impacts the particulate level in the exhaust manifold for regulating the air to fuel ratio available in the system.

Turning to FIG. 5C, the in-cylinder EGR is combined with CDA mode and additional in-cylinder EGR. Stroke S1 includes intake gas induction, stroke S2 compresses, fuel injector 310 injects fuel, and power stroke S3 transfers power to the crankshaft. However, stroke S4 does not comprise exhaust valve opening. Instead, the hot charge is trapped in the cylinder. A full cycle of cylinder deactivation mode is experienced for strokes 5-8, and the intake valve remains closed for piston stroke S9. The exhaust gases increase in heat due to the additional compression. Additional fuel injection comprises part of compression stroke S10. The amount of fuel injected can be tailored based on the first cycle so as to consume any remaining oxygen. Using up all of the oxygen in the cylinder is useful for controlling NOx pollution levels. If there is no or low oxygen levels, then there is no oxygen to form NOx.

Further in-cylinder EGR heats the charge and the cylinder further. Additional compression strokes consumes remaining fuel and oxygen and provides heat. When the exhaust valve is opened, the heat of the exhaust gas is quite high. The exhaust valve 150 can be opened on an even stroke in an electrically or hydraulically actuated valve train, or on strokes S12 or S16 or like stroke in a cam-actuated valve train.

FIGS. 5A-5G use a time scale broken up in 4-stroke blocks to make comparisons between the techniques easier, but not to limit applicability to only 4-stroke techniques. It is possible to implement any one of a 4-stroke technique, 6-stroke technique, 8-stroke technique or a combination thereof such that firing cylinders follow one technique while deactivated cylinders follow another technique. The above variable valve actuation (VVA) techniques are combinable also herewith to open or close the valves normally, early, or late, or combinations thereof. It is particularly beneficial to implement LIVC (Late Intake Valve Closing) to add heat to the aftertreatment system. Some cylinders can be selected to operate as drawn in FIGS. 5A-5G, while other cylinders operate with LIVC. The in-cylinder EGR, reverse breathing, and rebreathing can be selected for some cylinders of the engine to heat the exhaust, and LIVC can be used on one or more of the remaining cylinders to further contribute to heating the exhaust. This can raise TOT (Turbine-out-Temperature) and catalyst bed temperature.

To implement the strategy of FIG. 5C, a lean AFR is placed in the cylinder so that the second combustion event can occur without opening the intake or exhaust valves. For example, the first combustion at the peak of stroke 2 can comprise a 50:1 AFR, so that there is an oxygen remainder. AFR tailoring can be accomplished by below methods, and additional circulation methods.

Restricting operation to low load or idle is also an option for implementing the strategy of FIGS. 5B & 5C, as there is more flexibility in the AFR tailoring at low load or idle operation mode.

One aspect of these strategies is improving the fuel efficiency on the remaining firing cylinders. By deactivating some of the cylinders 1-6 using this technique, it is possible to increase the fuel injected to each of the remaining firing cylinders commensurate with desired torque output. The efficiency of those firing cylinders is increased, which increases the heat output, which increases the aftertreatment efficiency. A higher turbine-out-temperature (TOT) is achievable, so lower pollution exits the tailpipe. Deactivating cylinders also decreases the exhaust volume, but does not pump fresh air in to the exhaust during deactivation mode. This allows hot exhaust to stagnate in the aftertreatment.

An alternative to deactivating a cylinder to reduce the fresh air in the exhaust gases, it is possible to increase the flow rate and volume for another reason, such as spinning up a turbocharger. This would entail turning off the fuel injection while continuing to open and close the intake valve and the exhaust valve for the cylinder. Or, spinning up a turbocharger can be facilitated by controlling the timing of exiting CDA mode for a cylinder so that re-compressed charge fluid is expelled at a timing when the turbine 510 needs additional volume for running the compressor 512.

Other in-cylinder EGR techniques are available. When the engine is running too lean, it is possible to draw exhaust from the exhaust manifold to the inlet manifold. One strategy uses reverse breathing. The other strategy uses rebreathing.

Reverse-Breathing

When the engine is running lean, such as at idle, the AFR can be 50:1-100:1. This differs from rich modes, where the AFR can be 140:1 or 150:1. A high AFR has a high oxygen content, which provides a lot of opportunity for NOx to form. But, in some high load or highway cruising conditions, a large airflow through the engine occurs to meet power demands. At lower loads or lower engine RPMs, it is possible to draw exhaust from the exhaust manifold through to the inlet manifold using reverse-breathing techniques. Reverse-breathing can be used to improve TOT (turbine out temperature) and to improve BTE (brake thermal efficiency). WA techniques, particularly LIVC, can be used to additionally improve TOT to improve NOx retention in the catalyst.

Reverse-breathing helps lower AFR by enriching the intake gas with exhaust gas. The exhaust gas contains some amount of fuel and contains chemicals that dilute the combustible intake gas (reduces oxygen for combustion). The exhaust gas that is re-compressed in this way is very hot, which raises aftertreatment temperature. The combustion results can be similar to or better than traditional EGR that ducts the exhaust gasses in an external circuit outside of the engine 100 from the exhaust side to intake side. In reverse-breathing, the exhaust gas is drawn through the engine valves. The reverse-breathing techniques reduce the utilization of, or eliminates the need for, the external EGR circuit and improves heat retention at the engine block.

In one aspect, reverse-breathing can be used without the external EGR circuit during heat-up modes, such as start-up or DPF regeneration, when it is beneficial to retain heat in the engine block. Once the engine block is heated to an efficient temperature, the external EGR circuit can be used to power the turbine for a highway cruising mode. Or, the external EGR circuit can be used when all-cylinder firing mode is needed to reach engine power output demands, and in-cylinder EGR techniques can be used at power settings low enough to permit the disclosed techniques. Hybrid use of both reverse-breathing, in-cylinder EGR, and external EGR can be used to tailor pollution management.

In another aspect, cylinder deactivation improves fuel economy at low load and idle by reducing losses affiliated with the otherwise low use cylinders. When using CDA mode on selected cylinders, the firing cylinders have their fuel increased or their AFR lowered to make up for the torque missing from the CDA cylinders. CDA mode can be combined with reverse-breathing to permit recompression of exhaust gas prior to expulsion to the intake manifold 103. Or, combustion can occur with a fuel injection. This can be seen by comparing FIGS. 5E & 5F.

Figure 5D:
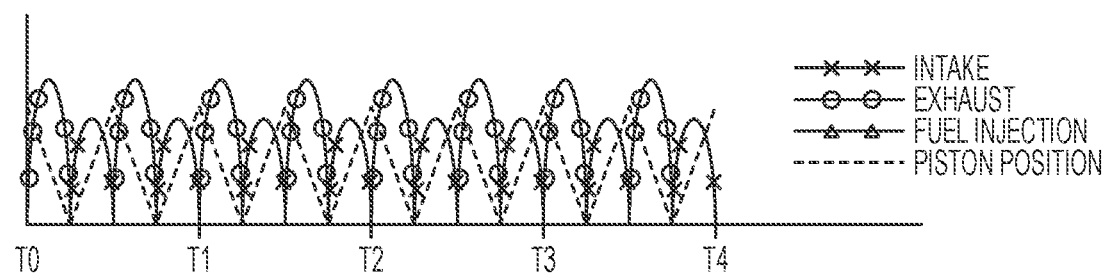
Figure 6A:
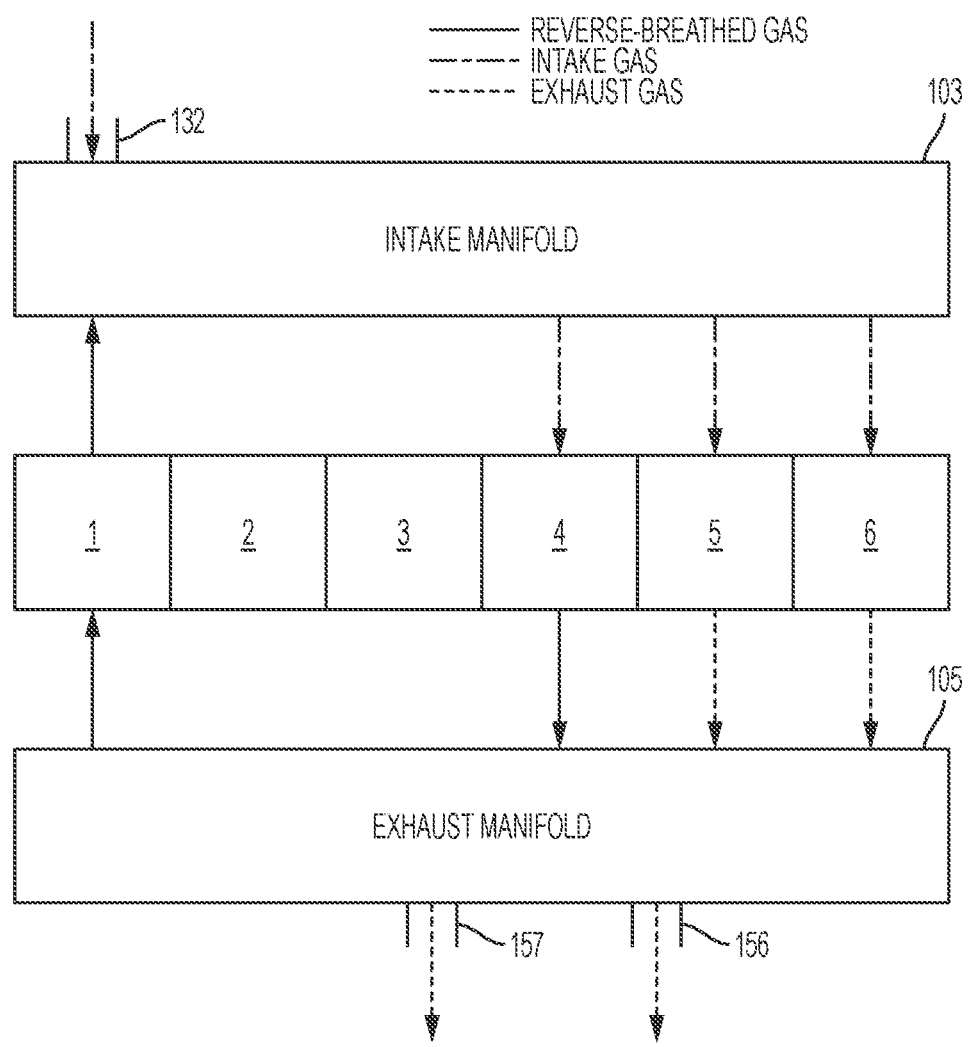
FIGS. 6A-6C show variants for reverse-breathing mode.

To lower the AFR for efficient, high-temperature combustion, a reverse-breathing mode is used to pull exhaust gas back to the intake manifold 103 from the exhaust manifold 105. In FIGS. 5D & 6A, cylinder 1 is effectively a 2-stroke EGR pump. Intake gas enters the intake manifold 103, but the opening and closing of the intake valve 130 and the exhaust valve 150 on cylinder 1 is timed to draw exhaust gas from the exhaust manifold 105 to the intake manifold 103. The in-cylinder EGR lowers the fresh air in the intake manifold 103, resulting in a lower AFR in the firing cylinders (4, 5 & 6). In FIG. 6A, cylinders 2 & 3 are in CDA mode, and no fluid is drawn from the intake manifold 103 to the exhaust manifold 105 through cylinders 2 & 3.

The number and location of an intake manifold port 132 can be selected to tailor the flow pattern of the intake gases in to the intake manifold 103. Likewise, a number and location of exhaust ports 155, 156 can be tailored to direct the collection and re-distribution of exhaust gas. For example, the intake manifold port 132 can be placed above cylinder 1 so that convective forces can direct the distribution of hot and cold gases. Very hot reverse-breathed gas can mix with colder intake gas. CDA mode cylinders 2 & 3 can be near to the reverse-breathing cylinder 1 to facilitate cross-flow across the intake manifold 103 or to avoid drawing down hot reverse-breathed gas. A large delta can facilitate homogenous mixing, or can be used to permit stagnation of heat at one end of the intake manifold 103. More than one intake manifold port 132 can supply fresh or external EGR to the intake manifold. Or, individual tubing or "finger" style ducting can be used to tailor flow to the cylinders 1-6.

More than one exhaust manifold port 157, 156 can permit tailoring of the back-pressure, or can permit custom ducting routes for exhaust gas from firing cylinders versus CDA mode cylinders, among other options. For example, exhaust manifold port 157, being nearer to the CDA mode cylinders, can be connected to the external EGR circuit in a way that directs those gasses to the optional EGR cooler 455 in FIG. 1, bypassing the turbine 510 and bypassing the catalyst 800 so as to avoid diluting the particulate content of the exhaust stream. Or, having one or more computer-controllable valve 1570 included in the exhaust manifold port 157, the gas from the CDA mode cylinders, being high heat, can be directed to the catalyst 800 to heat it. Additionally, adjusting the valve 1570 in the exhaust manifold port 157 or adjusting another downstream device can result in a backpressure for facilitating reverse-breathing. In yet another alternative, the valve 1570 can be controlled, and exhaust manifold pressure 105 or 1051 can be controlled to scavenge exhaust out of the inlet of turbocharger 501, or to scavenge or suction from another downstream device.

In like manner, the exhaust manifold port 156 can comprise one or more computer controllable valve 1560 to direct exhaust gas across the manifold 105, to an external EGR circuit, to provide a particular back pressure to the manifold 105, or to heat the catalyst 800 or control the AFR.

Figure 6B:
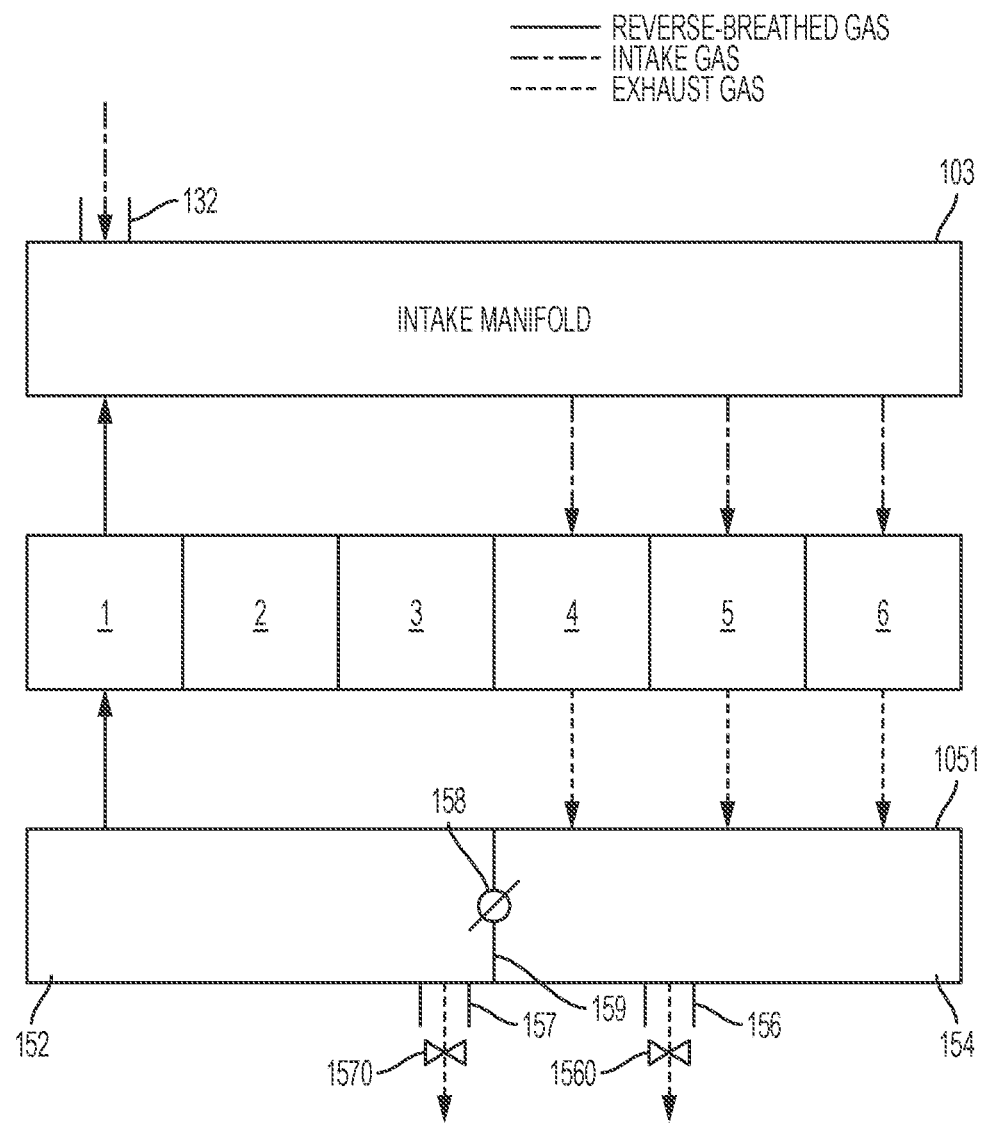

FIG. 6B provides an alternative, divided exhaust manifold 1051 comprising a first exhaust plenum 152 and a second exhaust plenum 154. Including a divider 159 in the exhaust manifold 1051 separates exhaust gas from the firing cylinders 4-6 and high heat gas from CDA mode cylinders. A pressure differential can be maintained between the exhaust plenums 152, 154. Or, controlled leakage can be permitted between the exhaust plenums 152, 154. The heat in the first exhaust plenum 152 can encourage the reverse-breathing in cylinder 1 and can permit greater control over the AFR of the reverse-breathed gas. A computer-controllable valve 158 can permit cross-flow between the exhaust plenums 152, 154. In some arrangements, it is beneficial to include additional dividers or additional manifolds. For example, an additional divider in first exhaust plenum 152 could create separation between cylinder 1 and cylinders 2 & 3 to restrict flow there between. The exhaust manifold 1051, or an additional manifold, could be designed to combine exhaust gases from cylinders 1, 2 & 3 at a strategic location downstream from exhaust ports 155, as before reaching EGR cooler 455, or before reaching valve 516.

Figure 6C:
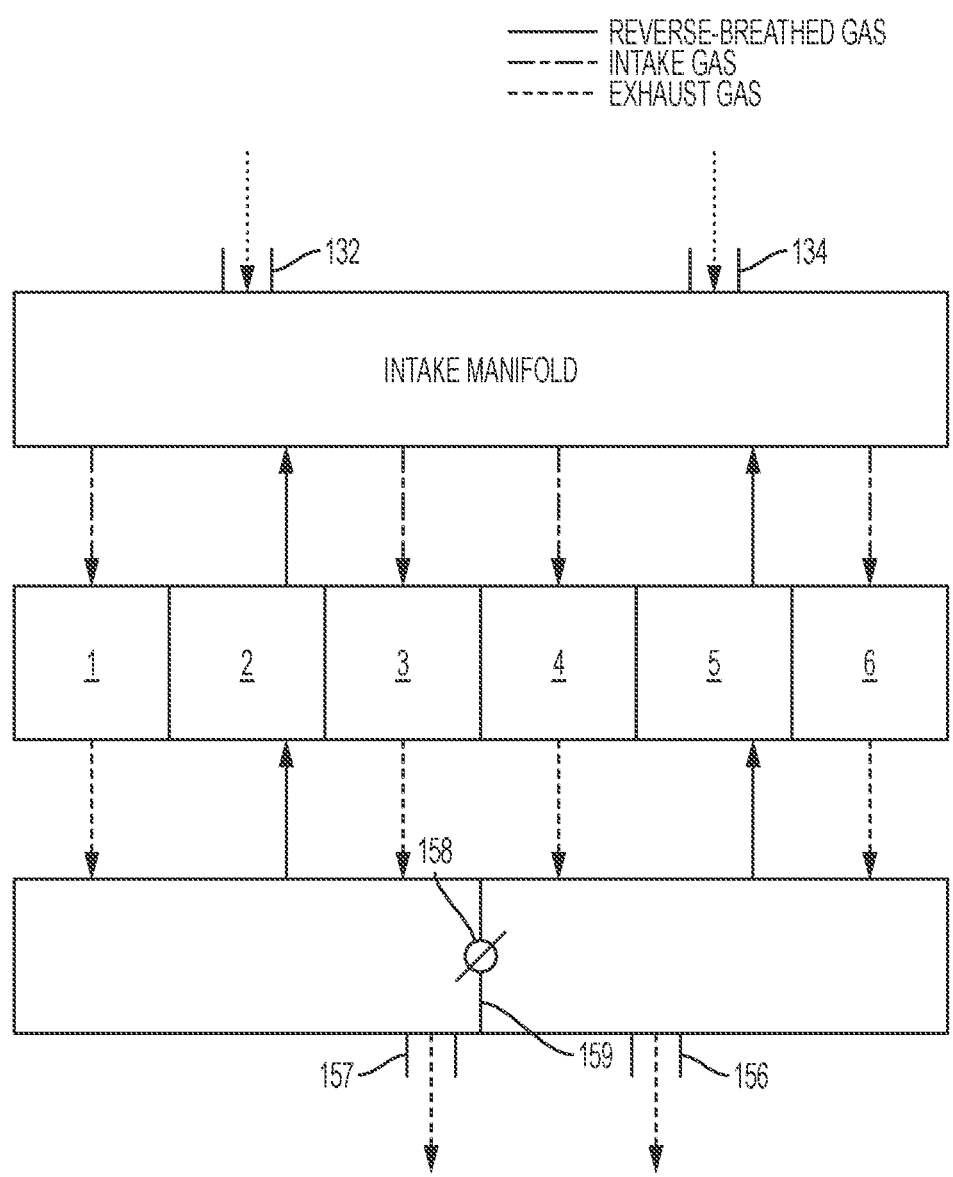

Turning to FIG. 6C, two intake manifold ports 132, 134 are used to tailor flow patterns and pressures within the intake manifold 103. The intake manifold ports 132, 134 are above the cylinders 2, 5 selected for reverse breathing. EGR charges are transported through cylinders 2, 5. The heat of combustion from cylinders 3, 4 can be higher than the heat of combustion for cylinders 1, 6 because of how heat and intake gas is distributed in the intake manifold 103. The exhaust manifold can be with or without a center divider 159 and valves 158, 1570, 1560

The valvetrain would be very complex to offer both CDA mode and either or re-breathing or reverse-breathing on all cylinders, and so one solution is to make cylinder 1 dedicated to either normal firing mode or re-breathing mode or reverse-breathing mode. The remaining cylinders can switch among other modes, such as normal firing mode, CDA mode, or CDA mode with other features. Or, halves or other fractions of the engine can be so dedicated, with some cylinders configured to switch between firing and re-breathing or reverse-breathing mode, and other cylinders can be configured to switch between firing mode, CDA mode and possibly another mode, such as engine braking. Normal firing mode cylinders can switch between normal intake valve lift, shown in FIG. 5A, and LIVC, shown in FIG. 5I. Two LIVC modes are shown, a first extended lift LIVC is shown in FIG. 5I from T0 to T2, and the intake valve has a higher and wider lift profile than that shown in FIG. 5A. Then, the LIVC mode is shown as extended duration or "boot" lift LIVC from T2 to T4 in FIG. 5I. The extended duration LIVC has the same lift height as in FIG. 5A for the first part of the intake valve opening, but then has a second lift height for a duration that extends past the lift duration of FIG. 5A. In either case, the two LIVC lift profiles increase TOT when applied to the firing cylinders that breath from the intake manifold to the exhaust manifold.

Figure 5E:
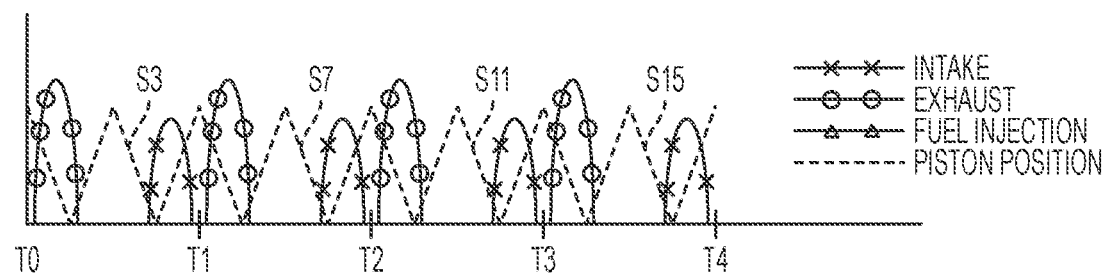
Figure 5F:
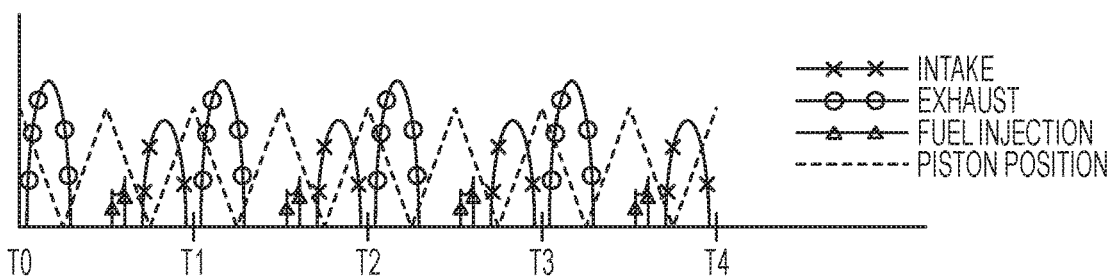
Figure 5G:
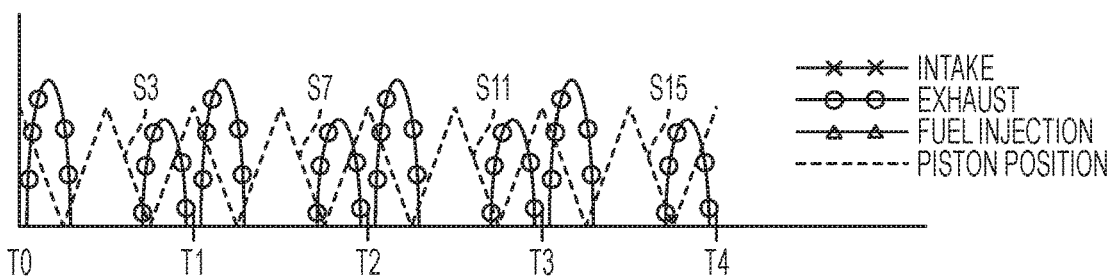
Figure 5H:
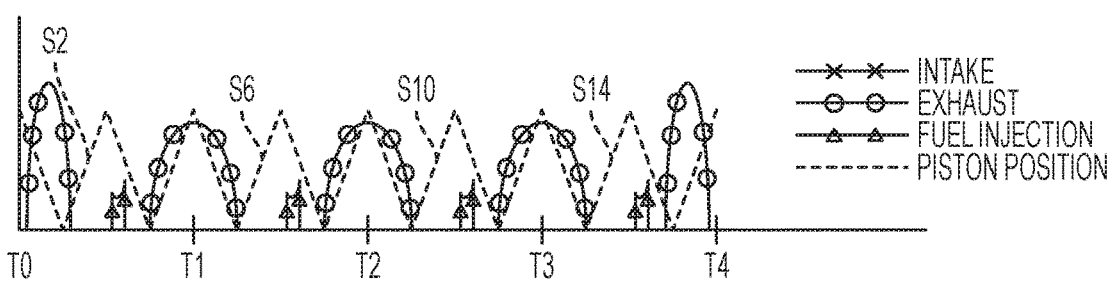
Figure 5I:
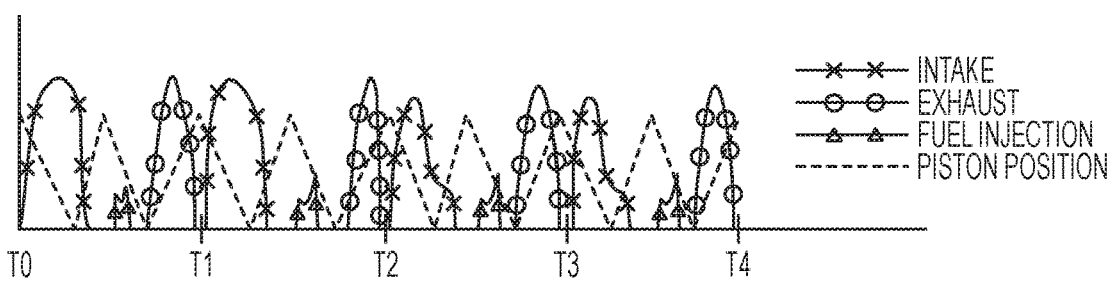
Figure 5J:
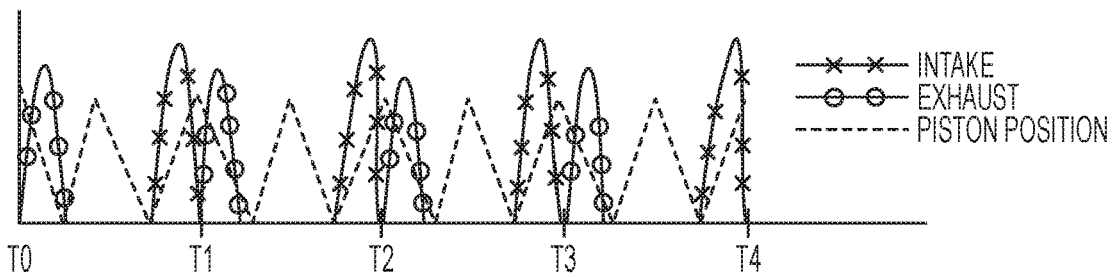

In FIG. 5J, the intake and exhaust valve open in reverse order from FIG. 5A to reverse breath exhaust to the intake manifold. Instead of the intake valve of FIG. 5J following the same lift profile as it was assigned in FIG. 5A, the intake valve follows the lift profile assigned to the exhaust valve of FIG. 5A. Likewise, the exhaust valve profile for the exhaust valve lift of FIG. 5J follows the lift profile assigned to the intake valve of FIG. 5A. This makes the exhaust valve have a lower lift profile that the intake valve in FIG. 5J.

When at least one cylinder is dedicated to only re-breathing or reverse-breathing, it is possible to eliminate the external EGR circuit. The dedicated cylinder can perform necessary pumping of EGR gas to the intake manifold 103.

FIGS. 5D & 6A explain reverse-breathing as it relates to the valve opening profiles and piston travel. A 2-stroke technique is implemented on cylinder 1. Cylinder 2 & 3 can follow one of FIG. 5B or 5C for in-cylinder EGR, or can be wholly deactivated for CDA mode (no fuel injection, no intake valve or exhaust valve action). And, cylinders 4-6 can follow FIG. 5A for 4-stroke combustion. In cylinder 1, every down stroke of the piston 160 pulls gas from the exhaust manifold 150 or 1501 (plenum 152). Every up stroke pushes that exhaust gas in to the intake manifold 103.

An alternative shown in FIG. 5E interleaves a compression stroke to heat the reverse-breathed gas. The downstroke of the piston 160, from TDC to BDC, at strokes 1, 5, 9 & 13 pulls in exhaust gas with the exhaust valve 150 opened. The up-stroke of the piston 160, from BDC to TDC, at stroked 4, 8, 12 & 16 pushes compressed exhaust out of the cylinder. The compression strokes 2, 6, 10 & 14 permit compression-ignition or combustion of fuel and oxygen remaining in the exhaust. The low AFR reverse-breathed gas is put in to the intake manifold to lower the oxygen content of the intake manifold. This is useful for pollution and thermal management.

In FIG. 5F, fuel injection occurs. The compression strokes 2, 6, 10 & 14 culminate with fuel injection and a subsequent power stroke contributes to the power output of the engine. The hot charge is exhausted through the intake valve 130 on strokes 4, 8, 12 & 16.

Returning to FIGS. 6A & 6B, reducing the number of firing cylinders to three firing cylinders reduces the fuel to air ratio for any related speed or load. So, it is possible to increase fuel injected to the firing cylinder to increase the torque output therefrom, which also increases the heat and fuel efficiency of those cylinders. Running cylinder 1 as a dedicated cylinder drawing from the exhaust manifold 105, 1051 can deliver the same amount of exhaust gas to the intake manifold 103 as is expelled by two cylinders firing in 4-stroke mode.

Re-Breathing

Re-breathing and reverse-breathing help lower AFR by enriching the charge air in the cylinder with exhaust gas. Many of the benefits of thermal and pollution management inure to the below re-breathing discussion from the above discussion of reverse-breathing. For example, both techniques are beneficial for raising the heat of the exhaust gas and can be used at engine speeds where there is insufficient gas for spinning up a turbocharger 501 and both techniques can be used to re-charge CDA mode cylinders or firing cylinders.

Reverse-breathing entails reversing flow from the exhaust manifold 105, 1051 to the intake manifold 103. But, re-breathing is not intended to adjust the intake manifold 103 by pushing exhaust gas from the exhaust manifold to the intake manifold. Instead, re-breathing draws exhaust gas in to the cylinder to re-use the exhaust gas in the cylinder without opening the intake valve 130 for that cylinder. This form of in-cylinder EGR can also avoid transportation of EGR gas through ducting of an external EGR circuit. Or, this form of in-cylinder EGR can be used when the flow rate is insufficient to use the external EGR circuit.

In-cylinder EGR in re-breathing mode uses up fuel remainders and oxygen remainders in the exhaust gas. In a first technique, shown in FIGS. 5G and 7A, cylinders 2 & 5 re-breath exhaust gas by opening the exhaust valve during a down-stroke of the piston shown at strokes 1, 5, 9, & 13. In FIG. 5G, a compression stroke is followed by a power stoke. The air-spring effect returns some power of compression back to the crankshaft. In strokes 4, 8, 12 & 16, the exhaust valve is opened again to release the charge to the exhaust manifold.

In a second technique, shown in FIG. 5H, cylinders 2 & 5 transition from firing mode of FIG. 5A by opening the exhaust valve in stroke 1. Then, fuel injection occurs near the apex between strokes 2 & 3. The exhaust valve is held open for the duration of strokes 4 & 5 so the upward piston travel pushes the exhaust charge out, and then the downwards piston travel re-breathes in exhaust gas from the exhaust manifold. The long-duration exhaust valve opening technique can be used with or without fuel injection, but is shown once for brevity. Also, the last exhaust valve opening of a firing mode can be held open in to the start of the re-breath technique.

The re-breathing improves TOT (turbine out temperature) and improves BTE (brake thermal efficiency). For example, one set-up using 2 cylinders in re-breathing at 1200 RPMs and 50 ft-lb torque output setting can reduce AFR about 40%, increase TOT about 20%, and increase BTE about 5%.

Figure 8:
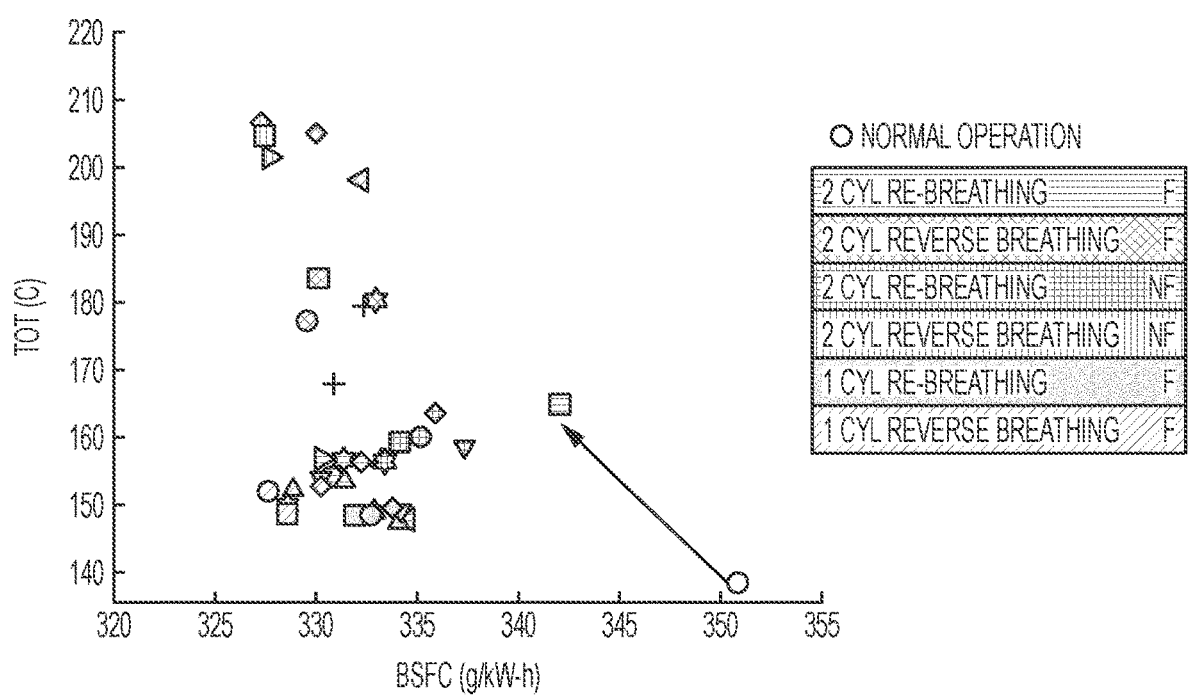
FIG. 8 shows in-cylinder EGR modes contrasted for turbine out temperature versus brake-specific fuel consumption.

Reverse breathing further improves both TOT & BTE, with some reverse breathing results yielding a TOT above 250 degrees Centigrade, which is close to an ideal aftertreatment catalyst bed temperature. For example, one set-up using 2 cylinders reverse-breathing at 1200 RPMs and 50 ft-lb torque output setting can decrease AFR 70%, increase TOT 53%, and increase BTE 14%. Additional results can be seen in FIG. 8, where the turbine out temperature (TOT), in degrees Centigrade, is compared to the brake-specific fuel consumption (BSFC) in grams per kiloWatt-hour.

Utilizing 2 cylinders in re-breathing mode and having fuel injection F, as in FIG. 5H yields great improvements in BSFC versus normal operation mode according to FIG. 5A. However, using 2 cylinders in reverse-breathing mode and having fuel injection F according to FIG. 5F yields similar BSFC, but higher TOT. So, based on thermal management goals, it is possible to choose between the two in-cylinder EGR modes.

Similarly, 2 cylinders in re-breathing mode and no fuel injection NF according to FIG. 5G has slightly worse BSFC and higher TOT than the fueled scenario of FIG. 5F. But, 2 cylinder reverse-breathing with no fuel injection NF according to FIG. 5E has the highest TOT values and the lowest BSFC values in this example. This mode can be selected for best fuel economy and highest ability to heat the catalyst. But, when the catalyst is already quite hot, it is possible to select one of the lower TOT in-cylinder EGR modes to conserve fuel or to control the oxygen or particulate content for a next firing sequence or piston cycle.

So, moving to 1 cylinder re-breathing mode with fuel injection F has the lowest TOT, but still it outperforms normal operation mode BSFC. 1 cylinder reverse breathing mode with fuel injection outperforms the 1 cylinder re-breathing mode for BSFC and TOT. The 2-cylinder modes outperform both 1 cylinder modes, but, either 1-cylinder mode can be selected when 5 cylinders are needed to meet power output demands to yield performance improvements for the system.

Normally, valve design is for one-way flow. It is possible to redesign the valves used for reverse-breath and re-breath techniques to optimize them for the flow of gas from the exhaust manifold to the intake manifold. What has been discovered is that designing the valves for one-way flow (intake to exhaust), and then using that valve set in reverse-breath or re-breath modes, is better for the end combustion result. There is better back-pressure in this valve design, and this limits the gas pulled through the reverse-breathing and re-breathing cylinders compared to the gas pulled through the normally-operating cylinders.

So, the intake valves dedicated to reverse-breathing or re-breathing can continue to be optimized for fluid flow from the intake manifold 103 to the exhaust manifold 105, 1051. This benefits combustion when these cylinders are in firing mode or consuming fuel or oxygen in in-cylinder EGR modes. With the intake valves 130 closed, an EGR charge is drawn through the exhaust valves 150 in to one or more in-cylinder EGR cylinders.

The exhaust valve head, and corresponding opening at the top of the cylinder, is smaller than the intake valve head and corresponding opening at the top of the cylinder. The intake valve opening is bigger to have a higher flow rate and draw more intake gases for combustion. In in-cylinder EGR modes, the small size of the exhaust opening is advantageous, because it limits the amount of EGR that happens via the process. The mixture in the intake manifold 103 is not made too rich. This creates a natural EGR throttling, and an additional flow restriction mechanism becomes optional and does not need to be added on in all design scenarios.

The EGR charge is expelled through the intake valves 130. The intake valves 130 are designed for intake action, not exhaust action, and so the expulsion to the intake manifold 103 is inefficient. The intake valves 130 and exhaust valves 150 also differ in hardness and shape. To exhaust out the intake valve 130, to handle the higher temperature of exhaust gas, it becomes necessary to put an exhaust-type valve in the intake valve location. This impacts the cost of the valve train, as higher temperature-tolerant material must be used on both intake valves 130 and exhaust valves 150.

The system can be implemented on a limited duty cycle engine with a discrete switching system. The limited duty cycle avoids need for cams and avoids complex camless systems, though the rebreathing and reverse breathing can be designed and developed for the more complex operational modes. A cam system can also be developed for either mode.

To be a discrete switching system, the cylinders can be individually selected for mode of operation. So, an individual cylinder selection is made. One, discrete cylinder is selected for in-cylinder EGR mode. One or more additional discrete cylinder can be selected for in-cylinder EGR mode. The remaining cylinders operate normally.

Figure 7A:
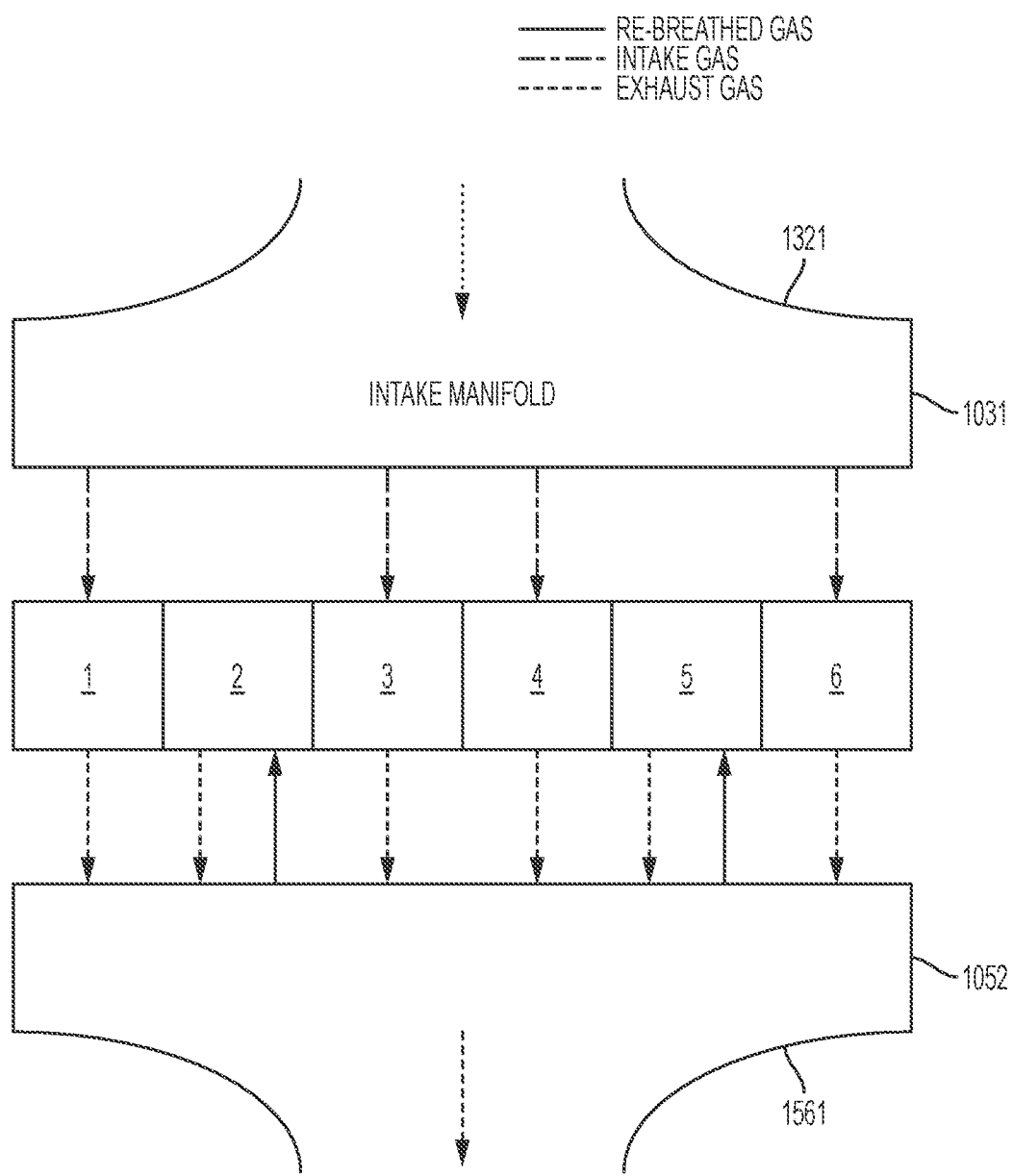
FIGS. 7A-7C show variants for re-breathing mode.
Figure 7B:
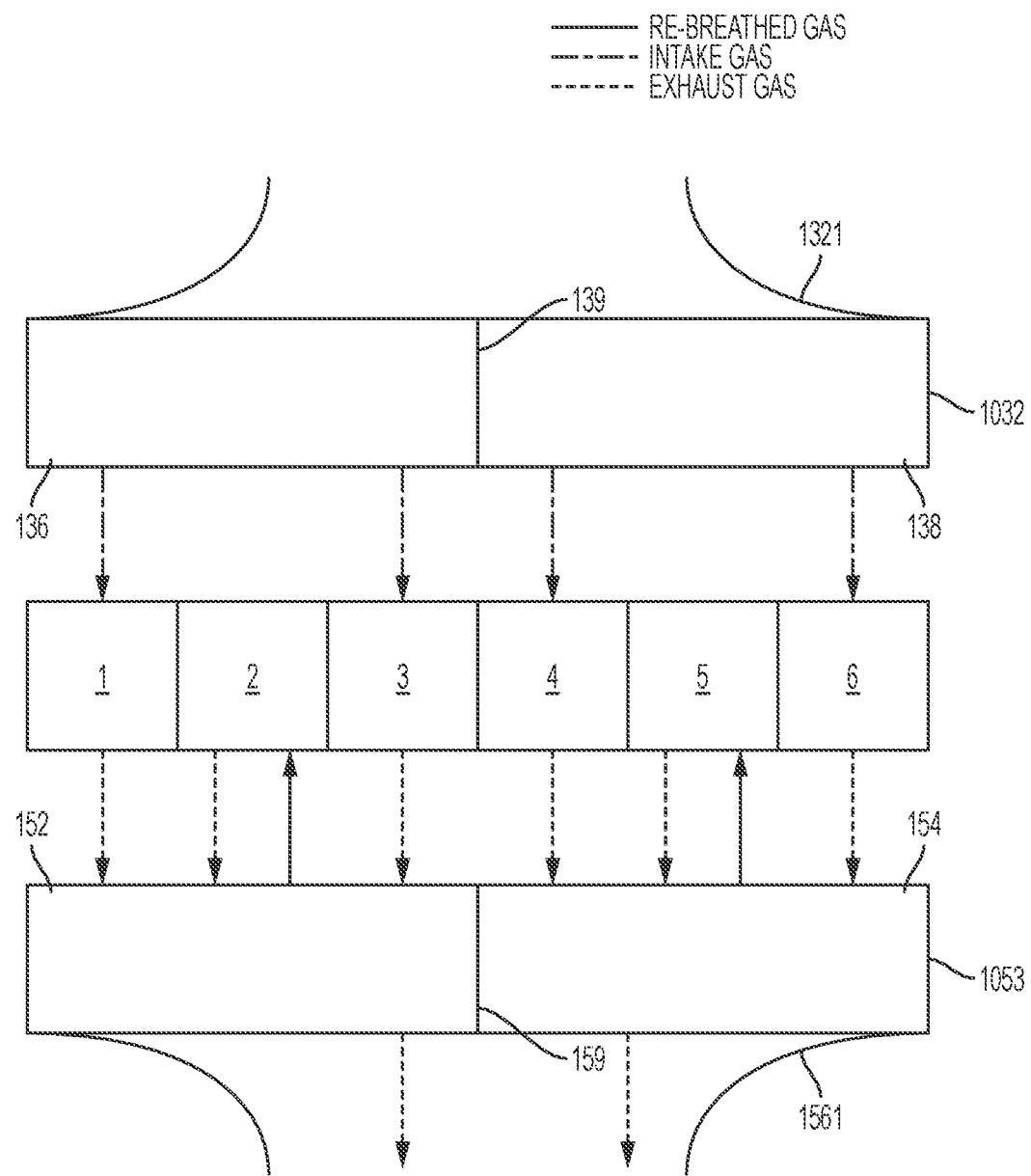
Figure 7C:
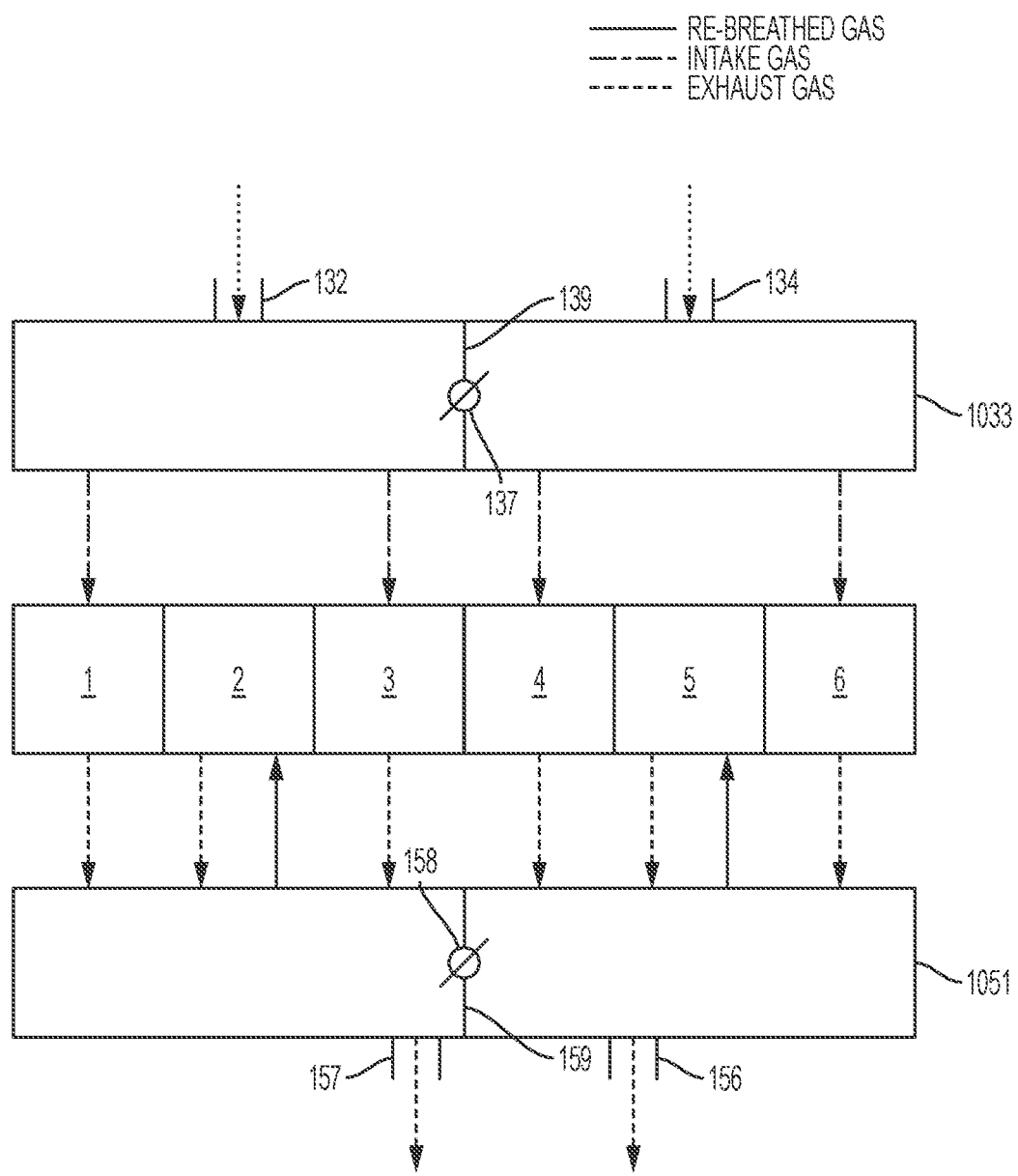

FIGS. 7A-7C build on the plenum and manifold port concepts of FIGS. 6A-6C. Like FIGS. 6A-6C, re-breathing can be used with or without cylinder deactivation mode. FIGS. 6A & 6B use reverse-breathing with CDA mode, and FIGS. 6C-7C illustrate in-cylinder EGR techniques without CDA mode. The illustrations do not exclude the use of additional and alternative operational modes. In-cylinder EGR techniques can be used more cylinders than illustrated, and can be combined with each other. In FIGS. 7A-7C, cylinders 2 and 5 are selected for discrete switching between normal firing mode and re-breathing. Depending on valve-train design, firing order, or both, cylinders 1 & 6, 3 & 4, or 2 & 5 could be paired for re-breathing. The pair selection applies equally to reverse-breathing. Re-breathing is not limited to 2 cylinders, and can apply to one cylinder, half of the cylinders, or other numbers of cylinders. There are operational modes where it can be advantageous to use one or more in-cylinder EGR modes on all of the cylinders for one or more firing sequences or for one or more cycles.

To make cylinder pair selection less critical, the manifold 1031 can be designed to uniformly distribute intake gas across the cylinders, and the exhaust manifold 1052 can be designed to uniformly dissipate the exhaust gas, as in FIG. 7A. The intake manifold port 1321 is centered, the exhaust manifold port 1561 is centered, and there are no dividers forming plenums. Otherwise, hot zones develop. Cylinders 3 & 4 run near normally because they are so close to the fresh air source, but cylinders 1 & 6 are furthest from the intake and near to the re-breathed cylinders, and so cylinders 1 & 6 get hot faster than the other cylinders. So, designating cylinders 2 & 5 for in-cylinder EGR in this scenario impacts efficiency more optimally than the other pairings.

Otherwise, it is possible to select cylinders for reverse-breathing or re-breathing based on the manifold design. By choosing location correctly, it is possible to align a reverse-breathing cylinder or re-breathing cylinder with a particularly "rich" location in the manifold, while leaving the firing cylinders in "lean" areas of the manifold. So, in FIG. 7B, it is possible to add an intake manifold divider 139 to intake manifold 1032. This forms a first intake plenum 136 and a second intake plenum 138. The intake manifold port 1321 feeds both intake plenums 136, 138. The exhaust manifold 1053 comprises first exhaust plenum 152 and second exhaust plenum 154, which expel exhaust to exhaust manifold port 1561. The division permits the formation of "an engine within an engine." Half of the engine 100 can be deactivated in cylinder deactivation mode while the other half remains active, either firing or some combination of in-cylinder EGR mode, firing, or other modes. Or, one half of the engine can be optimally firing with a particular AFR and high BTE, while the other half manages particulates by recombusting exhaust gas. The dual mode engine has many uses for pollution and thermal management.

In FIG. 7C, the intake manifold ports 132, 134 can be connected to different sources, such as one to a fresh air intake assist device and the other to an external EGR circuit. Exhaust manifold ports 157, 156 can likewise be connected to dedicated circuits for pollution and thermal management techniques. Computer controllable valves 137, 158, 1570, 1560, 516 can be utilized to further tailor flow and permit conversion between divided engine operation and all-cylinders firing mode. Valve control can be part of the EGR control 1412 logic in computer control system 1400, with commands issued by EGR controller 400.

Figure 9:
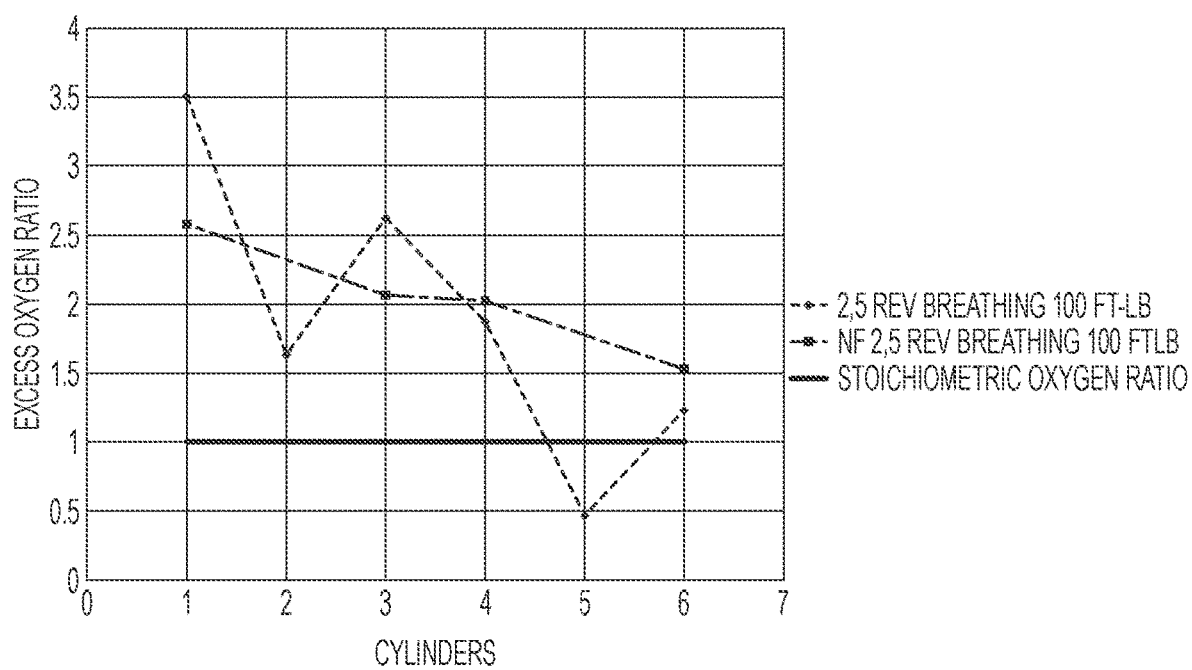
FIG. 9 shows excess oxygen ratio above cylinders for an exemplary manifold an in-cylinder EGR techniques.

FIG. 9 explains the excess oxygen ratio that occurs above cylinders 1-5 when the intake manifold 103 is designed with an asymmetrical intake manifold port 132 as shown in FIG. 6A. Having air enter the intake manifold at one end of the inline engine causes flow to stagnate above cylinder 6, while the air is quite oxygenated above cylinder 1. Implementing the in-cylinder EGR mode shown in FIG. 6C with the intake manifold of FIG. 6A results in non-stoichiometric results. A stoichiometric AFR above each cylinder would yield no excess oxygen above the cylinders. But, using the technique of FIG. 5F on cylinders 2 and 5 and using the technique of FIG. 5A on cylinders 1, 3, 4, & 6 shows that the in-cylinder EGR mode of reverse-breathing lowers the oxygen content over cylinders 2 & 5 in an un-even fashion. Cylinder 5 is too low, resulting in sooty output. The combustion mode cylinders have too much oxygen and the NOx output can be high because of the availability of oxygen to which nitrogen bonds.

Using reverse-breathing mode with no fuel injection NF, according to FIG. 5E yields a sloped but more homogenous oxygen profile across the cylinders. This reinforces the ability to tailor the shape of the plenum, the placement of inlet ports, and other tenets of FIGS. 6A-7C for the purpose of controlling the air to fuel ratio in the manifolds 103, 105 and ultimately in the catalyst 800.

A control strategy can be developed for entering and exiting normal mode to one of reverse breathing or re-breathing. The strategy can comprise switching from a normal firing mode, such as illustrated in FIG. 5A to any one of the techniques outlined in FIGS. 5B-5G without having to stop the engine. It is also possible to switch between cylinder deactivation mode, re-breathing mode and reverse breathing mode from cycle to cycle. The cylinders can switch between any of the techniques outlined in FIGS. 5A-5G from cycle to cycle. As above, a cycle can comprise 2 or more strokes of the piston within its cylinder, with 4 strokes per cycle being illustrated for convenience for all but FIG. 5D, which illustrates a 2-stoke cycle.

Additionally, the in-cylinder EGR technique can be varied among the cylinders so that one cylinder of a multi-cylinder engine performs one of the techniques, while another cylinder of the multi-cylinder engine performs a different one of the techniques. The techniques outlined in FIGS. 5A-5J can be combined in various ways so that one or more cylinders use one technique, while one or more other cylinders use a second technique. Yet another one or more cylinders can use a third technique, all in the same firing sequence. The firing sequence is the cylinder activation pattern over the engine. A firing sequence comprises the number of cycles necessary to utilize each of the cylinders. A firing sequence can be correlated to piston reciprocations, so piston positions are shown in FIGS. 5A-5J. For example, in some firing sequences, cylinders 1 & 3 would begin a combustion mode or follow a 4-stroke sequence such as reverse breathing shown in FIG. 5F or 5J, then cylinders 4 & 6 would begin a sequence such as one of the LIVC techniques shown in FIG. 5I, then cylinders 2 & 5 would begin a sequence. In other examples, cylinders 1, 3, & 5 would begin a stroke sequence, then cylinders 2, 4, & 6 would follow a stroke sequence.

Figure 10:
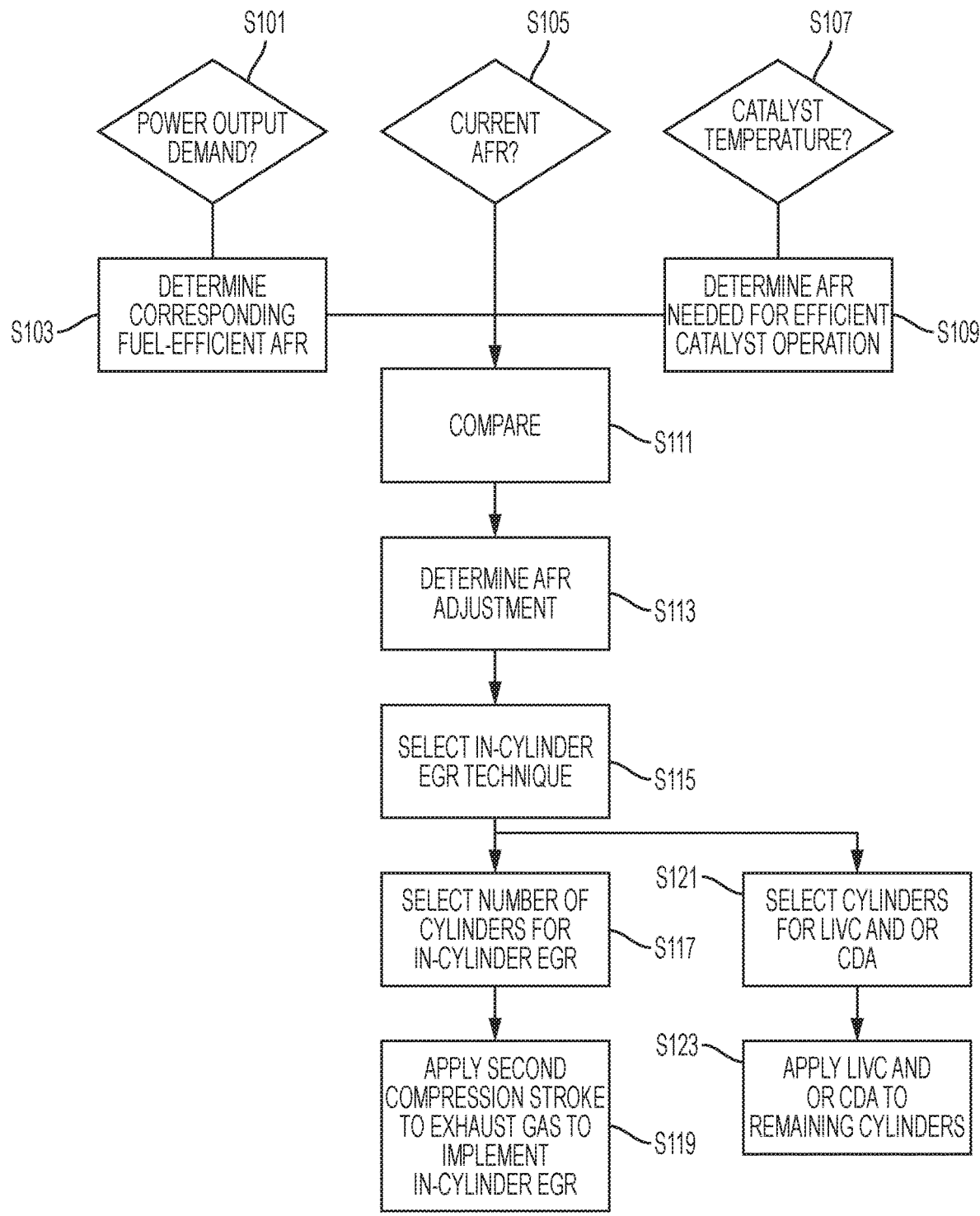
FIG. 10 is a flow diagram for methods of air fuel ratio and temperature management.

In one method for air to fuel ratio management, and turning to FIG. 10, a power output request is sensed for the engine in step S101. This can be done by monitoring accelerator pressure or a load on the engine, for example. It is then possible to determine a fuel-efficient air to fuel ratio based on the sensed power output in step S103. This can be calculated real-time or accessed from a stored look-up table, for example. The most fuel efficient AFR could be quite lean, requiring the in-cylinder EGR mode to dilute the oxygen and raise the heat and power of combustion. The in-cylinder EGR mode selected can be in accordance with tenets of FIG. 8, above. Some in-cylinder EGR modes have higher heat results, and others have better fuel consumption results. Tradeoffs between these aspects help determine how best to arrive at desired temperature, oxygen and particulate results. So, a comparison step can be included as step S111.

A current air to fuel ratio is sensed in one or both of an intake manifold connected to the engine and an exhaust manifold connected to the engine in step S105. Additionally, or alternatively, a temperature can be sensed in the manifolds or in the catalyst as additional data in step S107. The temperature data can be used to determine an AFR necessary for efficient catalyst operation in step S109. Alternatively, the temperature data can be used to tailor the temperature or particulate content of the intake and exhaust manifolds, as discussed above with respect to FIGS. 6A-7C.

An air to fuel ratio adjustment is determined in step S113. This can be based on the determined fuel-efficient air to fuel ratio from step S103 and based on the sensed current air to fuel ratio from step S105. An in-cylinder exhaust gas recirculation technique is selected based on the determined air to fuel ratio adjustment in step S115. The in-cylinder exhaust gas recirculation technique adjusts an oxygen and particulate content of exhaust gas resulting from combustion. A number of cylinders of the multiple-cylinder engine are selected to implement the in-cylinder exhaust gas recirculation technique in step S117. The intake valves and the exhaust valves are controlled for the selected number of cylinders to adjust the oxygen and particulate content of the exhaust gas by applying a second compression stroke of the respective reciprocating pistons of the selected number of cylinders to the exhaust gas in step S119. The second compression stroke is applied because the exhaust gas has already experienced at least one compression stroke to become exhaust gas. Being retained in the cylinder in CDA mode, or being pulled back in to the cylinder for re-breathing mode or reverse-breathing mode causes the piston to act on the exhaust a second time, whether for combustion, compression, or pumping.

In tandem or in series with selecting a number of cylinders for in-cylinder EGR in step S117, a number of cylinder deactivation (CDA) and or late intake valve closing (LIVC) cylinders can be selected in step S121. While a second compression stroke is applied in step S119, other cylinders on the engine can apply late intake valve closing and possibly other cylinders can apply cylinder deactivation so that each cylinder contributes to increasing TOT. In an alternative, some cylinders can remain normal, according to FIG. 5A. LIVC can be used on some cylinders while an in-cylinder EGR technique is used on one or more other cylinders. Or, CDA can be used on some cylinders while an in-cylinder EGR technique is used on one or more other cylinders.

Another method for temperature management can comprise sensing a power output request for the engine in step S101 and sensing a current air to fuel ratio in one or both of an intake manifold connected to the engine and an exhaust manifold connected to the engine in step S105. A low temperature condition is sensed in one or more of the intake manifold 103, the exhaust manifold 105, or the catalyst 800. A thermal management air to fuel ratio adjustment is determined in step S109 based on the sensed current air to fuel ratio and based on the low temperature condition. An in-cylinder exhaust gas recirculation technique is selected in step S115 based on the determined thermal management air to fuel ratio adjustment. The in-cylinder exhaust gas recirculation technique adjusts an oxygen and particulate content of exhaust gas resulting from combustion to lower the air to fuel ratio of gases available for combustion. A number of cylinders of the multiple-cylinder engine are selected to implement the in-cylinder exhaust gas recirculation technique in step S117. The intake valves and the exhaust valves for the selected number of cylinders are controlled to apply a second compression stroke of the respective reciprocating pistons of the selected number of cylinders to the exhaust gas in step S119. The temperature of the exhaust gas is adjusted by re-combusting the exhaust gas that has had a second compression stroke applied. A catalyst temperature can be controlled by controlling the exhaust gas temperature. Instead of manifold temperature, the catalyst temperature can be monitored to determine that a low temperature condition exists.

The methods disclosed herein can be implemented by a system such as outlined in FIG. 1 comprising a multiple-cylinder engine 100, the engine comprising respective reciprocating pistons 160 in the multiple cylinders 1-6, the respective reciprocating pistons connected to a crankshaft 101 for rotation of the crankshaft. A computer-controllable fuel injection system comprising a fuel controller 300 is configured to inject fuel in to the multiple cylinders. Respective computer-controllable intake valves and exhaust valves linked to WA controller 200 are configured for opening and closing the multiple cylinders. A computer control system 1400 is part of a computer control network shown in FIG. 2 to connect to the fuel injection system and the respective intake valves and respective exhaust valves. The system comprises a processor 1403, a tangible memory device 1401, and processor-executable control algorithms for implementing the disclosed methods.

Other implementations will be apparent to those skilled in the art from consideration of the specification and practice of the examples disclosed herein.

What is claimed is:

1. A system for aftertreatment temperature management in a multiple-cylinder engine, comprising:
   a multiple-cylinder engine comprising respective reciprocating pistons in multiple cylinders, the respective reciprocating pistons connected to a crankshaft for rotation of the crankshaft, a computer-controllable fuel injection system configured to inject fuel in to the multiple cylinders, and respective computer-controllable intake valves and exhaust valves for opening and closing the multiple cylinders; and
   a computer control network connected to the multiple-cylinder engine, the computer control network comprising one or more processors, a tangible memory device, and processor-executable control algorithms, which, when executed by the one or more processors, implements aftertreatment temperature management by causing the one or more processors to:
   sense a power output request for the engine and an aftertreatment temperature;
   determine an air to fuel ratio that satisfies the sensed power output request and that controls the temperature of the aftertreatment;
   sense a current air to fuel ratio in one or both of an intake manifold connected to the engine and an exhaust manifold connected to the engine;
   determine an air to fuel ratio adjustment by processing the determined air to fuel ratio and by processing the sensed current air to fuel ratio;
   select an in-cylinder exhaust gas recirculation technique based on the determined air to fuel ratio adjustment, wherein the in-cylinder exhaust gas recirculation technique adjusts an oxygen and particulate content of exhaust gas resulting from combustion;
   select at least one EGR cylinder of the multiple-cylinder engine to implement the in-cylinder exhaust gas recirculation technique;
   select at least one cylinder of the multiple-cylinders to satisfy the sensed power output request;
   control the at least one cylinder to satisfy the sensed power output request; and
   control the intake valves to open and the exhaust valves to close for the selected at least one EGR cylinder to adjust the oxygen and particulate content of the exhaust gas by applying at least a second compression stroke of the respective reciprocating piston of the at least one EGR cylinder to the exhaust gas to push the exhaust gas through to the intake manifold.

2. The system of claim 1, wherein the processor-executable control algorithms further cause the one or more processors to adjust fuel injection by the fuel injection system based on the selected in-cylinder exhaust gas recirculation technique.

3. The system of claim 2, wherein adjusting fuel injection to the multiple-cylinders comprises increasing fuel injection to the at least one cylinder of the multiple-cylinders to increase a torque output of the combustion cylinders.

4. The system of claim 2, wherein adjusting fuel injection comprises terminating fuel injection to the at least one EGR cylinder.

5. The system of claim 2, wherein adjusting fuel injection comprises terminating fuel injected in to the at least one cylinder.

6. The system of claim 5, wherein controlling the at least one cylinder to satisfy the sensed power output request comprises implementing cylinder deactivation mode on the at least one cylinder.

7. The system of claim 1, wherein selecting the in-cylinder exhaust gas recirculation technique comprises selecting among a reverse-breathing mode and a re-breathing mode.

8. The system of claim 7, wherein selecting the in-cylinder exhaust gas recirculation technique comprises selecting two in-cylinder exhaust gas recirculation techniques to implement simultaneously on different cylinders of the multiple cylinders.

9. The system of claim 1, wherein the processor-executable control algorithms further cause the one or more processors to implement a cylinder deactivation mode to deactivate fuel injection, intake valve actuation and exhaust valve actuation for at least one stroke cycle of the reciprocating pistons, wherein a stroke cycle comprises from two to sixteen strokes of the reciprocating pistons within their respective cylinders.

10. The system of claim 9, wherein the processor-executable control algorithms further cause the one or more processors during the cylinder deactivation mode to reactivate fuel injection by the fuel injection system to the selected number of cylinders after a respective piston stroke from bottom dead center to top dead center in the selected number of cylinders without opening either of the respective intake valves or the respective exhaust valves for the selected number of cylinders.

11. The system of claim 1, wherein the processor-executable control algorithms implement the in-cylinder exhaust gas recirculation technique comprising a reverse-breathing mode configured to:
adjust timing of respective exhaust valve actuation for the selected number of cylinders to correspond with piston travel in the selected number of cylinders such that the exhaust valves for the selected number of cylinders open when respective reciprocating pistons travel from top dead center to bottom dead center in the selected number of cylinders so as to draw exhaust from an exhaust manifold in to the selected number of cylinders; and
adjust timing of respective intake valve actuation for the selected number of cylinders to correspond with piston travel in the selected number of cylinders such that the respective intake valves open when respective reciprocating pistons travel from bottom dead center to top dead center in the selected number of cylinders.

12. The system of claim 11, wherein the processor-executable control algorithms further cause the one or more processors during the reverse-breathing mode to pump exhaust through the selected number of cylinders in a two-stroke cycle, and wherein the second compression stroke corresponds to respective reciprocating pistons traveling from bottom dead center to top dead center in the selected number of cylinders.

13. The system of claim 1, wherein controlling the at least one cylinder to satisfy the sensed power output request comprises implementing a late intake valve closing technique on the at least one cylinder.

14. The system of claim 13, wherein controlling the at least one cylinder to satisfy the sensed power output request comprises implementing cylinder deactivation technique on at least a second cylinder.

15. A method for aftertreatment temperature management in a multiple-cylinder engine, comprising:
sensing a power output request for a multiple cylinder engine and an aftertreatment temperature;
determining an air to fuel ratio that satisfies the sensed power output request and that adjusts the temperature of the aftertreatment to filter nitrous oxide;
sensing a current air to fuel ratio in one or both of an intake manifold connected to the engine and an exhaust manifold connected to the engine;
determining an air to fuel ratio adjustment by processing the determined air to fuel ratio and by processing the sensed current air to fuel ratio;
implementing an in-cylinder exhaust gas recirculation technique based on the determined air to fuel ratio adjustment, wherein the in-cylinder exhaust gas recirculation technique adjusts an oxygen and particulate content of exhaust gas resulting from combustion;
selecting at least one exhaust gas recirculation cylinder of the multiple-cylinder engine to implement the in-cylinder exhaust gas recirculation technique;
selecting at least one cylinder of the multiple-cylinders to satisfy the sensed power output request;
controlling the at least one cylinder to satisfy the sensed power output request; and
controlling the intake valves to open and the exhaust valves to close for the selected at least one EGR cylinder to adjust the oxygen and particulate content of the exhaust gas by applying at least a second compression stroke of the respective reciprocating piston of the at least one EGR cylinder to the exhaust gas to push the exhaust gas through to the intake manifold.

16. The method for aftertreatment temperature management of claim 15, wherein the determined air to fuel ration adjusts the temperature of the aftertreatment to filter nitrous oxides with 78% or greater efficiency.

17. The method for aftertreatment temperature management of claim 15, further comprising implementing a late intake valve closing valve technique.

* * * * *